(12) United States Patent
Iijima et al.

(10) Patent No.: US 7,030,946 B2
(45) Date of Patent: Apr. 18, 2006

(54) LIQUID CRYSTAL DISPLAY DEVICE, SUBSTRATE ASSEMBLY FOR LIQUID CRYSTAL DISPLAY DEVICE, AND ELECTRONIC APPARATUS HAVING A SUBSTANTIALLY EQUIVALENT DISPLAY QUALITY IN BOTH TRANSMISSIVE AND REFLECTIVE DISPLAY MODES

(75) Inventors: Chiyoaki Iijima, Ima (JP); Takeshi Hagiwara, Matsumoto (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/316,985

(22) Filed: Dec. 11, 2002

(65) Prior Publication Data

US 2003/0122998 A1    Jul. 3, 2003

(30) Foreign Application Priority Data

Dec. 12, 2001  (JP) .............................. 2001-378701
Mar. 6, 2002   (JP) .............................. 2002-061049

(51) Int. Cl.
    *G02F 1/1335*    (2006.01)
(52) U.S. Cl. .................... 349/106; 349/113; 257/72; 257/435; 430/7
(58) Field of Classification Search ............... 349/106, 349/113, 114; 257/72, 435; 430/7
See application file for complete search history.

(56) References Cited

U.S. PATENT DOCUMENTS

| | | | | |
|---|---|---|---|---|
| 6,084,650 A | * | 7/2000 | Sekiguchi | 349/106 |
| 6,147,728 A | * | 11/2000 | Okumura et al. | 349/106 |
| 6,552,764 B1 | * | 4/2003 | Fujioka et al. | 349/106 |
| 6,573,960 B1 | * | 6/2003 | Kobayashi et al. | 349/113 |
| 6,586,772 B1 | * | 7/2003 | Bijlsma | 257/72 |
| 6,671,025 B1 | * | 12/2003 | Ikeda et al. | 349/156 |
| 6,798,476 B1 | * | 9/2004 | Hanakawa et al. | 349/113 |

FOREIGN PATENT DOCUMENTS

| | | |
|---|---|---|
| JP | 54-124997 | 9/1979 |
| JP | 59-050425 | 3/1984 |
| JP | 60-59322 | 4/1985 |
| JP | 61-230101 | 10/1986 |
| JP | 1-259396 | 10/1989 |
| JP | 6-23035 | 3/1994 |
| JP | 10-186347 | 7/1998 |
| JP | 10-239681 | 9/1998 |
| JP | 10-268289 | 10/1998 |
| JP | 10-268299 | 10/1998 |
| JP | 10-319386 | 12/1998 |
| JP | 10-319388 | 12/1998 |

(Continued)

*Primary Examiner*—Huyen Ngo
(74) *Attorney, Agent, or Firm*—Harness, Dickey & Pierce, P.L.C.

(57) ABSTRACT

A transflective liquid crystal display device comprising a pair of substrates; a liquid crystal layer between the substrates; reflective films are provided on an internal surface of a lower substrate which reflects light incident from an upper substrate; color filters provided above the reflective films, each containing a plurality of color layers which have different colors and are disposed to correspond to dots forming a display region; and lighting means. The dots have a reflective region in which the reflective film is present and a transmissive region in which the reflective film is not present. In addition, the color filters have opening portions that overlap the reflective film in each dot. Since the non-color regions are provided in the color filter corresponding to the reflective films, light used in reflective display mode is sufficiently secured and the chroma in a transmissive display mode can be maintained.

9 Claims, 21 Drawing Sheets

FOREIGN PATENT DOCUMENTS

| | | |
|---|---|---|
| JP | 11-072779 | 3/1999 |
| JP | 11-072780 | 3/1999 |
| JP | 11-109331 | 4/1999 |
| JP | 11-183891 | 7/1999 |
| JP | 11-183891 A | 7/1999 |
| JP | 11-183892 | 7/1999 |
| JP | 2000-010117 | 1/2000 |
| JP | 2000-029012 | 1/2000 |
| JP | 2000-111902 | 4/2000 |
| JP | 2000-338482 | 12/2000 |
| JP | 2000-338482 A | 12/2000 |
| JP | 2001-108980 | 4/2001 |
| JP | 2001-125094 | 5/2001 |
| JP | 2001-221995 | 8/2001 |
| JP | 2001-242452 | 9/2001 |
| JP | 2003-177392 | 6/2003 |
| JP | 2003-177392 A | 6/2003 |
| JP | 2003-202557 | 7/2003 |

\* cited by examiner

LIQUID CRYSTAL DISPLAY DEVICE, SUBSTRATE ASSEMBLY FOR LIQUID CRYSTAL DISPLAY DEVICE, AND ELECTRONIC APPARATUS HAVING A SUBSTANTIALLY EQUIVALENT DISPLAY QUALITY IN BOTH TRANSMISSIVE AND REFLECTIVE DISPLAY MODES

TECHNICAL FIELD

The present invention relates to liquid crystal display devices, substrate assemblies used for liquid crystal display devices, and electronic apparatuses, and more particularly, relates to a transflective liquid crystal display device having superior visibility, in which sufficiently bright display can be performed not only in a transmissive display mode but also in a reflective display mode.

BACKGROUND ART

Since electrical power consumption has been small since light sources such as a backlight are not provided, reflective liquid crystal display devices have been widely used for various portable electronic apparatuses. However, in reflective liquid crystal display devices, since display is performed using outside light such as natural light or illumination light, there has been a problem in that it has been difficult to view the display in a dark place. Accordingly, a liquid crystal display device has been proposed in which display can be viewed in a bright place by using outside light, as is a general reflective liquid crystal display device, and can also be viewed in a dark place by using a built-in light source such as a backlight. That is, in the liquid crystal display device described above, a reflective and a transmissive display mode are both provided, and in accordance with ambient brightness, the reflective or transmissive display mode can be selectively used. As a result, while decreasing electrical power consumption, clear display can be performed when it is dark. Hereinafter, in this specification, this type of liquid crystal display device is called "transflective liquid crystal display device".

In recent years, concomitant with advancement of portable electronic apparatuses, OA apparatuses, and the like, apparatuses having color liquid crystal displays have been requested. In addition, in the field of the transflective liquid crystal display apparatuses described above, color displays have been increasingly desired. As a transflective liquid crystal display device that can respond to the request described above, the structure in which a color filter is provided on one of an upper substrate and a lower substrate has been proposed. In the case of the this type of transflective color liquid crystal display device, in a reflective display mode, after passing through the color filter, outside light incident from the upper substrata side is reflected from a reflective layer and then passes again through the color filter. On the other hand, in a transmissive display mode, illumination light incident from the lower substrate side by lighting means such as a backlight passes through the color filter. In the general structure, in both a reflective display mode and a transmissive display mode, display has been performed using the same color filter.

In this type of transflective liquid crystal display device, as described above, incident light passes through the color filer twice in a reflective display mode and once in a transmissive display mode, thereby performing color display. Accordingly, for example, in the case in which the color filter having pale tints is used so as to preferentially display colors in a reflective display mode in which light passes twice through the color filter, it is difficult to obtain fine color display in a transmissive display mode in which incident light passes through the color filter only once. However, in order to solve the problem described above, in the case in which a color filter having dark tints are used so as to preferentially display colors in a transmissive display mode in which light passes once through the color filter, display in a reflective display mode in which incident light passes twice through the color filter becomes dark, and as a result, sufficient visibility cannot be obtained. As described above, in conventional transflective liquid crystal display devices, it has been difficult to perform display exhibiting fine colors and having high visibility in both a reflective display mode and a transmissive display mode.

The present invention was made in order to solve the problems described above, and an object of the present invention is to provide a transflective liquid crystal display device in which display exhibiting fine colors and having superior visibility can be performed in both a reflective and a transmissive display mode. In addition, the present invention has an object to provide a substrate assembly for forming the liquid crystal display device described above and to provide an electronic apparatus comprising the liquid crystal display device that has superior visibility.

DISCLOSURE OF INVENTION

In accordance with a first aspect of the present invention, a transflective liquid crystal display device comprises a pair of substrates which are an upper substrate and a lower substrate and which faces each other; a liquid crystal layer provided between the pair of substrates; reflective films which are provided on the internal surface of the lower substrate and which reflect light incident from the upper substrate; color filters provided above the reflective films, each containing a plurality of color layers which have different colors and which are disposed so as to correspond to dots forming a display region; and lighting means provided at the outer surface of the lower substrate, each of the dots having a reflective region in which the reflective film is present and a transmissive region in which the reflective film is not present for performing transflective display, wherein each of the color filters has non-color regions in regions each overlapping, in plan view, the reflective film in each dot.

According to this liquid crystal display device, since the non-color regions are provided in the color filter corresponding to the reflective films, the amount of light used in a reflective display mode can be sufficiently secured, and the chroma in a transmissive display mode can also be maintained. For example, even when the transmittance of the color filter is decreased so that the chroma in a transmissive display mode is improved, since a part of light reflected from the reflective film is allowed to pass through the non-color region of the color filter, decrease in amount of light can be suppressed, and hence the brightness in a reflective display mode can be maintained. In this liquid crystal display device, opening portions are preferably formed in the color filter so as to be used as the non-color regions. The structure may be formed in which the color filters are provided for the upper substrate. In addition, of course, the color filters may also be provided for the lower substrate.

As described above, in the liquid crystal display device having the structure described above, since a part of light incident from the upper substrate side passes through the non-color region in a reflective display mode, in a reflective display mode, light after passing through the color filter twice comprises non-colored light passing through the non-color region and colored light passing through a region (hereinafter referred to as "color region") in which the color layer is present. On the other hand, in a transmissive display mode, all the light that is emitted from the lighting means and passes through the transmissive region passes through the color region, and hence all the light passing through the color filter once in a transmissive display mode is colored light. As described above, since the difference in tint of color between light passing through the color filter twice in a reflective display mode and light passing through the color filter once in a transmissive display mode can be reduced, when the color layers of the color filter are optimized, display exhibiting fine colors in both a reflective and a transmissive display mode and having superior visibility can be obtained. That is, since the reflective region and the transmissive region are provided in each dot (that is, in each subpixel), and the non-color region is provided in the reflective region, by the behavior of incident light as described above, display exhibiting fine colors in both a reflective and a transmissive display mode and having superior visibility can be obtained.

When a liquid crystal display device having the structure described above is realized using a general method, in a manufacturing process, problems may arise in some cases in that variation in area of the non-color region becomes large, or misalignment occurs between the reflective region and the no-color region. As a result, irregularities in image or color displayed on a screen of one liquid crystal display device, variation in display properties between liquid crystal display devices, or the like may be generated thereby.

Accordingly, in accordance with a second aspect of the present invention, a transflective liquid crystal display device comprises a pair of substrates which are an upper substrate and a lower substrate and which face each other; a liquid crystal layer provided between the pair of substrates; reflective films which are provided on the internal surface of the lower substrate and which reflect light incident from the upper substrate; color filters provided above the reflective films, each containing a plurality of color layers which have different colors and which are disposed so as to correspond to dots forming a display region; and lighting means provided at the outer surface side of the lower substrate, each of the dots having a reflective region in which the reflective film is present and a transmissive region in which the reflective film is not present for performing transflective display. In the liquid crystal display device described above, the reflective films are formed in a strip shape extending along dot rows or dot lines composed of the dots disposed in one direction, the reflective films have width expansion portions in the respective dots, and non-color regions in which the color layers of each color filter are not present are each provided in at least a part of a region overlapping, in plan view, each width expansion portion of the reflective film in the corresponding dot.

In order to solve the problems of the liquid crystal display device according to the first aspect of the present invention, in the liquid crystal display device according to the second aspect, the reflective film having a particular shape is specified, and the position of the non-color region provided with respect to the corresponding reflective film is specified. That is, the features of the second aspect of the present invention are that the reflective films are formed in a strip shape extending along the rows or the lines composed of the dots disposed in one direction and have width expansion portions, having a larger width than that of the other part, in the respective dots, and that the non-color region is disposed in the region overlapping, in plan view, the width expansion portion in the corresponding dot.

According to this structure, variation in area of the non-color region or misalignment between the reflective region and the no-color region in manufacturing process can be reduced, and as a result, variation in display properties can be suppressed. The reasons why the problems in that variation in area of the non-color region or misalignment between the reflective region and the no-color region are likely to occur in the structure of the liquid crystal display device according to the first aspect and the reasons why the problems described above can be solved in the structure of the liquid crystal display device according to the second aspect will be described in detail in "Description of Preferred Embodiments" with reference to drawings.

In addition, the liquid crystal display device according to the second aspect may further comprise transparent conductive films each disposed in the reflective region and the transmissive region so as to cover at least the upper surface of each of the reflective films, wherein these laminated films each composed of the transparent conductive film and the reflective film may be formed into strip-shaped electrodes extending in the dot rows or the dot lines.

In this structure, since the transparent conductive film and the reflective film cooperatively form the strip-shaped electrode, due to the presence of the transparent conductive film located in the transmissive region, application of an electric field to the liquid crystal layer above the transmissive region can be smoothly performed, and in addition, due to the presence of the reflective film composed of a metal having a small resistivity as compared to that of the transparent conductive film, an effect in that the resistance of the entire electrode is reduced can be obtained. As described above, the strip-shaped electrodes can be formed for a passive matrix type liquid crystal display device or an active matrix type liquid crystal display device using thin-film diodes (hereinafter referred to as TFDs) as a switching element.

In addition, in the liquid crystal display device of the present invention, among the dots corresponding to different colors, each of the dots corresponding to at least one of the colors may have the non-color region having an area different from that of the non-color region of each of the dots corresponding to the other colors.

According to this structure, since the reflectance and the chroma of each color light can be adjusted for the individual dots corresponding to the color different from the others, the reflectance and the chroma (for example, hue in white display) of the entire reflected light can be optionally adjusted, and hence display quality such as display brightness and color in a reflective display mode can be improved.

In more particular, when the plurality of color layers having different colors are composed of red layers, green layers, and blue layers, the area of the non-color region of each of the dots corresponding to the green layers is preferably set to larger than the area of the non-color regions of each of the dots corresponding to the red layers and the blue layers.

Green color has a significantly high spectral luminous factor for the human eyes as compared to that of each of red and blue color. Accordingly, when the area of the non-color region in the dot for green color is set to large as compared to that of the non-color region in each of the dots for red color and blue color, as the overall reflective light, the reflectance and the color reproducibility can be improved.

In addition to the structure described above, among the dots corresponding to different colors, each of the dots corresponding to at least one of the colors may have the transmissive region having an area different from that of the transmissive region of each of the dots corresponding to the other colors.

According to the structure described above, since the transmittance and the chroma of each color can be adjusted for individual dots corresponding to different colors, the transmittance and the chroma (for example, hue in white display) of the entire transmitted light can be optionally adjusted. As a result, when this adjustment is performed together with that of the areas of the non-color regions described above, optical properties such as reflectance, transmittance, chroma of reflected light, chroma of transmitted light, and the like can be respectively adjusted, and hence display quality in both a reflective display mode and a transmissive display mode can be equally optimized.

In more particular, when the plurality of color layers having different colors are composed of red layers, green layers, and blue layers, the area of the transmissive region in each of the dots corresponding to the green layers is preferably set to smaller than the area of the transmissive regions of each of the dots corresponding to the red layers and the blue layers.

As described above, since green color has a high spectral luminous factor as compared to that of each of red color and blue color, when the area of the transmissive region of the dot corresponding to green color is set to smaller than that of the transmissive region of each of red and blue colors, the color balance is not degraded, and in addition, a sufficient transmittance can be maintained.

In addition, in the dot described above, it is preferable that the reflective region and the transmissive region in each of the dots be disposed adjacent to at least one side of a plurality of sides defining the each of the dots and be disposed adjacent to each other along said at least one side. In this case, as the at least one side of the dot, a pair of sides opposing each other among the plurality of sides defining the dot in an approximately rectangular shape may be considered. According to this structure, due to errors in manufacturing, even when a part of the dot in the vicinity of the periphery thereof becomes unable to perform display, since the areas of the reflective region and the transmissive region are both decreased, decrease in area of only one of the regions described above can be avoided. Accordingly, even when manufacturing errors occur, the case in which the areal ratio of the reflective region to the transmissive region is changed from a predetermined areal ratio can be avoided, and as a result, the balance of display quality between a reflective display mode and a transmissive display mode can be maintained. For example, in a liquid crystal display device having a shading layer shading the peripheries of dots, due to manufacturing errors, the shading layer may overlap a part of the dot in the vicinity of the periphery thereof, and hence this part of the dot may become unable to perform display in some cases. Even in this case, according to the present invention, change in areal ratio of the reflective region to the transmissive region from a predetermined (designed) areal ratio can be suppressed.

In addition, on the lower substrate described above, it is preferable that electrodes be provided for applying a voltage to the liquid crystal described above and that the reflective films have electrical conductivity and be electrically connected to the electrodes described above. According to this structure, compared to the case in which the electrodes are independently (separately from the reflective films) provided, the resistance can be reduced.

Next, in order to solve the problems described above, another transflective liquid crystal display device of the present invention comprises a pair of substrates which are an upper substrate and a lower substrate and which face each other; a liquid crystal layer provided between the pair of substrates; reflective films which are provided on the internal surface of the lower substrate and which reflect light incident from the upper substrate; color filters provided on the internal surface of the upper substrate, each containing a plurality of color layers which have different colors and which are disposed so as to correspond to dots forming a display region; and lighting means provided at the outer surface side of the lower substrate, each of the dots having a reflective region in which the reflective film is present and a transmissive region in which the reflective film is not present for performing transflective display. In the liquid crystal display device described above, the color filters each have non-color regions in which the color layers are not present, each non-color region being provided in at least a part of region overlapping, in plan view, the reflective region in each dot, and the distance between the end of the reflective region and the end of the non-color region, which oppose each other, is set to more than 15 μm.

According to this structure, since the end of the reflective film and the end of the non-color region, which oppose each other, is set to more than 15 μm, the non-color region does not protrude outside toward the transmissive region side, and hence the case in which desired optical properties are not obtained can be avoided. In addition, since alignment allowance is increased, the structure having resistance against bonding misalignment can be formed, and in addition, desired optical properties can be easily obtained. The detail will be described in "Description of Preferred Embodiments".

In addition, the present invention may be applied to a substrate assembly for use in a liquid crystal display device. That is, the substrate assembly may be provided with reflective films and disposed at the rear side of a liquid crystal display device or may be provided at the observer side of a liquid crystal display device without having reflective films.

That is, the former substrate assembly is used for a liquid crystal display device comprising dots corresponding to different colors, and color filters which are provided to overlap the dots, which transmit light having wavelengths corresponding to the colors for the dots. The former substrate assembly comprises a first substrate of a pair of substrates opposing to each other, for holding liquid crystal with a second substrate; and reflective films which are provided on the first substrate, which overlap a part of the respective dots, entire peripherical edges of which are disposed in the dots and which reflect light incident from a second substrate of the pair of substrates, wherein the shape of each of the reflective films is selected so that the opening portions are each disposed in a region overlapping each of the reflective films in the respective dots. In this substrate assembly, the color filters described above may be provided on the first substrate.

In addition, the latter substrate assembly is used for a liquid crystal display device comprising a pair of substrates opposing to each other for holding liquid crystal therebetween, and dots corresponding to different colors. The latter substrate assembly comprises a first substrate of a pair of substrates opposing to each other for holding the liquid crystal with a second substrate provided with reflective films which overlap a part of the dots, entire peripheral edges of which are disposed in the dots and which reflect light; and color filters which are provided on the first substrate so as to overlap the dots and which transmit light having wavelengths corresponding to the colors for the dots, the color filters being provided with opening portions in respective region each overlapping one of the reflective films disposed in the respective dots.

Next, an electronic apparatus of the present invention comprises the liquid crystal display device described above. According to this structure, an electronic apparatus comprising a liquid crystal display device, which can exhibit fine colors in both a reflective display mode and in a transmissive display mode and has superior visibility, can be provided.

DESCRIPTION OF PREFERRED EMBODIMENTS

Hereinafter, embodiments of the present invention will be described with reference to drawings. In the embodiments described below, the structures of the present invention are disclosed, but are not intended to limit the present invention. In addition, any modification may be performed without departing from the scope and sprit of the present invention. In the figures shown below, in order to facilitate understanding of individual layers and constituent members, the reduction scales thereof are made different from each other.

First Embodiment

Figure 1:
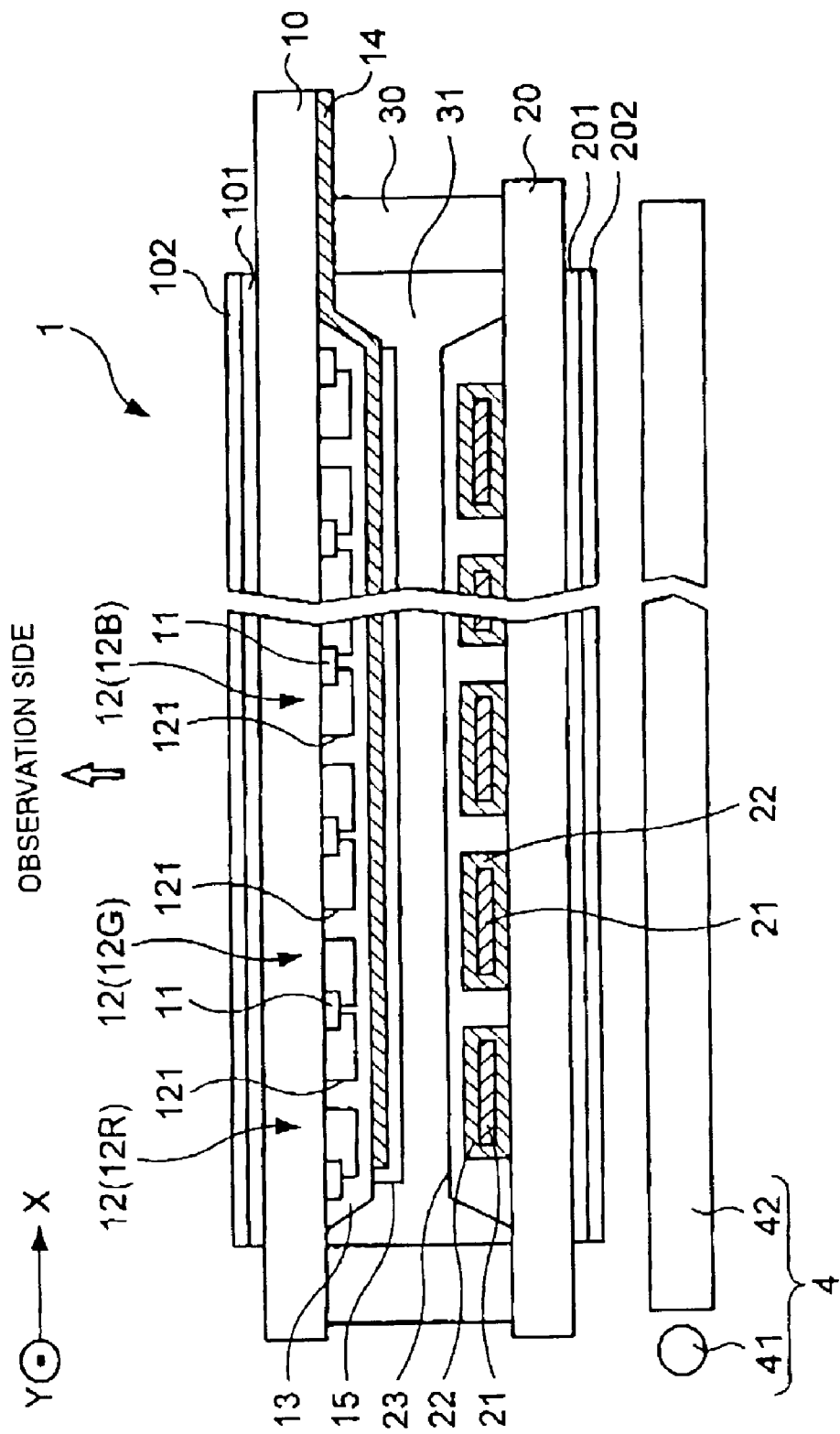
FIG. 1 is a cross-sectional view showing the structure of a liquid crystal panel according to a first embodiment of a liquid crystal display device of the present invention.

First, referring to FIG. 1, an embodiment in which the present invention is applied to a passive matrix type transflective liquid crystal panel will be described. As shown in the figure, a liquid crystal display device comprises a liquid crystal panel 1 and a backlight unit 4. The liquid crystal panel 1 has the structure in which a first substrate (upper substrate) 10 and a second substrate (lower substrate) 20 opposing thereto are bonded to each other with a sealing material 30 provided therebetween, and liquid crystal 31 such as a TN (twisted nematic) or a STN (super twisted nematic) type is enclosed in a region surrounded by the two substrates described above and the sealing material 30. The backlight unit 4 is disposed at the second substrate 20 side of the liquid crystal panel 1. Hereinafter, as shown in FIG. 1, a side opposite to the backlight unit 4 with respect to the liquid crystal panel 4 is called "observation side". That is, the "observation side" means a side at which an observer viewing a display image on the liquid crystal panel 1 is present.

The backlight unit 4 contains a light source 41 and light guide pale 42. The light source 41 is formed, for example, of an LED (Light Emitting Diode) or a cold cathode tube and irradiates a side-end surface of the light guide plate 42 with light. The light guide plate 42 is a plate member to guide light incident on the side-end surface, emitted from the light source 41, uniformly to a substrate surface of the liquid crystal panel 1. In addition, a diffuser is adhered to the surface of the light guide 42 opposing the liquid crystal panel 1 for uniformly diffusing light incident from the light guide 42 to the liquid crystal panel 1, and onto the surface of the light guide 42 at the side opposite to that described above, a reflective layer is adhered for reflecting light to the liquid crystal panel 1 side, which light is incident from the light guide plate 42 to the side opposite to the liquid crystal panel 1 (both of then are not shown in the figure). In this structure, the light source 41 is not always turned on, and when the liquid crystal display device is used in a place at which outside light is not sufficient, the light source 41 is turned on in accordance with the instruction by a user or a detection signal from a sensor.

In addition, the first substrate 10 and the second substrate 20 of the liquid crystal panel 1 are plate members, for example, formed of as glass, quartz, or plastic, having light transmission properties. Onto the outside (side opposite to the liquid crystal 31) surface of the first substrate 10, a retardation film 101 which compensates for interference color and a polarizer 102 polarizing incident light are adhered. In a manner similar to that described above, a retardation film 201 and a polarizer 202 are adhered onto the outside (side opposite to the liquid crystal 31) surface of the second substrate 20.

Figure 2:
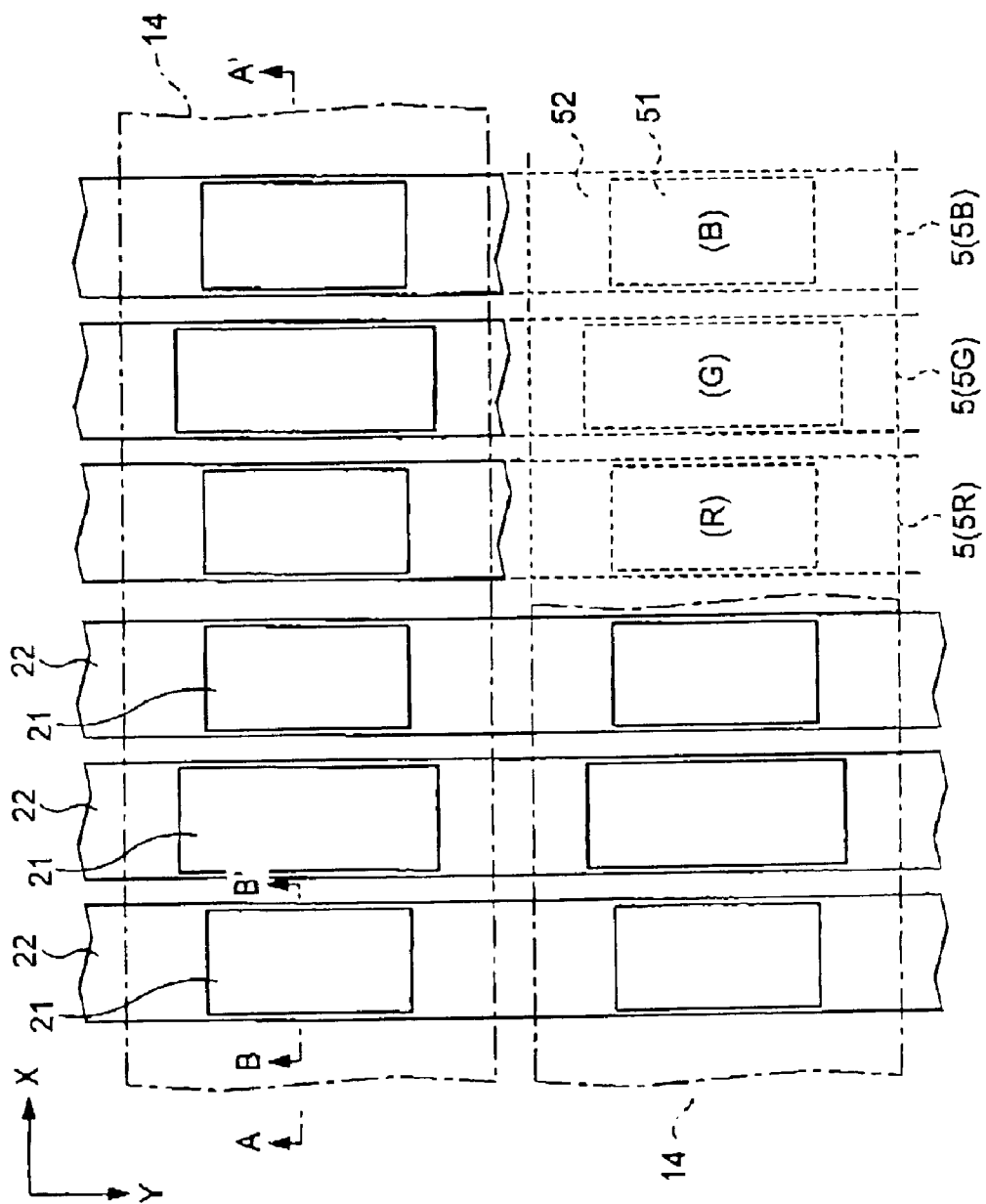
FIG. 2 is a plan view showing the relationship among common electrodes, segment electrodes, and reflective layers of the liquid crystal panel shown in FIG. 1.

On the first substrate 10, a plurality of common electrodes 14 is provided. In this embodiment, FIG. 2 is a plan view of showing the structure of some elements forming the liquid crystal panel 1. A cross-sectional view taken along the line A-A' in FIG. 2 corresponds to the view shown in FIG. 1. As shown in FIGS. 1 and 2, each common electrode 14 is a strip-shaped electrode formed of a transparent conductive material such as ITO (Indium Tin Oxide), and extends in the X direction shown in the figure.

In addition, on the second substrate 20, a plurality of segment electrodes 22 is provided. As is the common electrode 14, each segment electrode 22 is a strip-shaped electrode formed of a transparent conductive material such as ITO and extends in the direction intersecting the common electrode 14 (that is, in the Y-direction in the figure). As shown in FIG. 1, the surface of the first substrate 10 provided with the common electrodes 14 thereon and the surface of the second substrate 20 provided with the segment electrodes 22 thereon are covered with alignment films 15 and 23, respectively. The alignment films 15 and 23 are each an organic film formed, for example, of a polyimide resin and are processed by rubbing treatment for determining the orientation of the liquid crystal 31 when a voltage is not applied thereto.

The liquid crystal 31 held between the first substrate 10 and the second substrate 20 changes its orientation direction in accordance with a voltage applied between the common electrode 14 and the segment electrode 22. Hereinafter, in this embodiment, as shown in a lower right portion in FIG. 2, a region 5 at which the common electrode 14 and the segment electrode 22 oppose each other is referred to as "dot". That is, the dot 5 is a minimum unit of a region in which the orientation direction of the liquid crystal 31 is changed in accordance with a voltage applied thereto. As shown in FIG. 2, a plurality of the dots 5 is disposed in the X direction and the Y direction to form a matrix, and each of the dots corresponds to one of red color (R), green color (G), and blue color (B). In addition, one set of three dots (subpixel) 5R, 5G, and 5B corresponding to these three colors mentioned above forms one pixel(subpixel) which is a minimum unit of a display image.

Next, as shown in FIG. 1, on the internal surface (the liquid crystal 31 side) of the first substrate 10, a shading layer 11, color filters 12, and an overcoat layer 13 are formed. Among those mentioned above, the overcoat layer 13 is formed of a resin material, such as an acrylic or epoxy resin, and serves to planarize steps formed by the shading layer 11 and the color filters 12. The common electrodes 14 described above are formed on the surface of this overcoat layer 13.

The shading layer 11 has a grating shape so as to cover gaps (that is, regions other than those at which the common electrodes 14 and the segment electrodes 22 oppose each other) formed between the dots 5 disposed in a matrix and serves to shade the peripheries of the dots 5. This shading layer 11 is formed, for example, of a black resin material containing carbon black or the like dispersed therein or a metal such as chromium (Cr).

Next, the color filters 12 (12R, 12G, and 12B) are formed of resin layers so as to correspond to the dots 5 and are colored by dyes or pigments corresponding to the colors of the dots 5, that is, are each colored in one of red (R), green (G), and blue (B). Accordingly, of light passing through the liquid crystal 31 and entering the first substrate 10, light having a wavelength corresponding to the color of each color filter 12 is selectively emitted to the observation side. In addition, as shown in FIG. 1, in the color filters 12, opening portions 121 are formed at positions each corresponding to an approximately central portion of each dot 5, and these openings 121 will be described later. In this embodiment, the structure (so-called stripe pattern) is shown by way of example in which the color filters 12 having the same color are aligned along a plurality of the dots 5 disposed in the Y direction.

Figure 3:
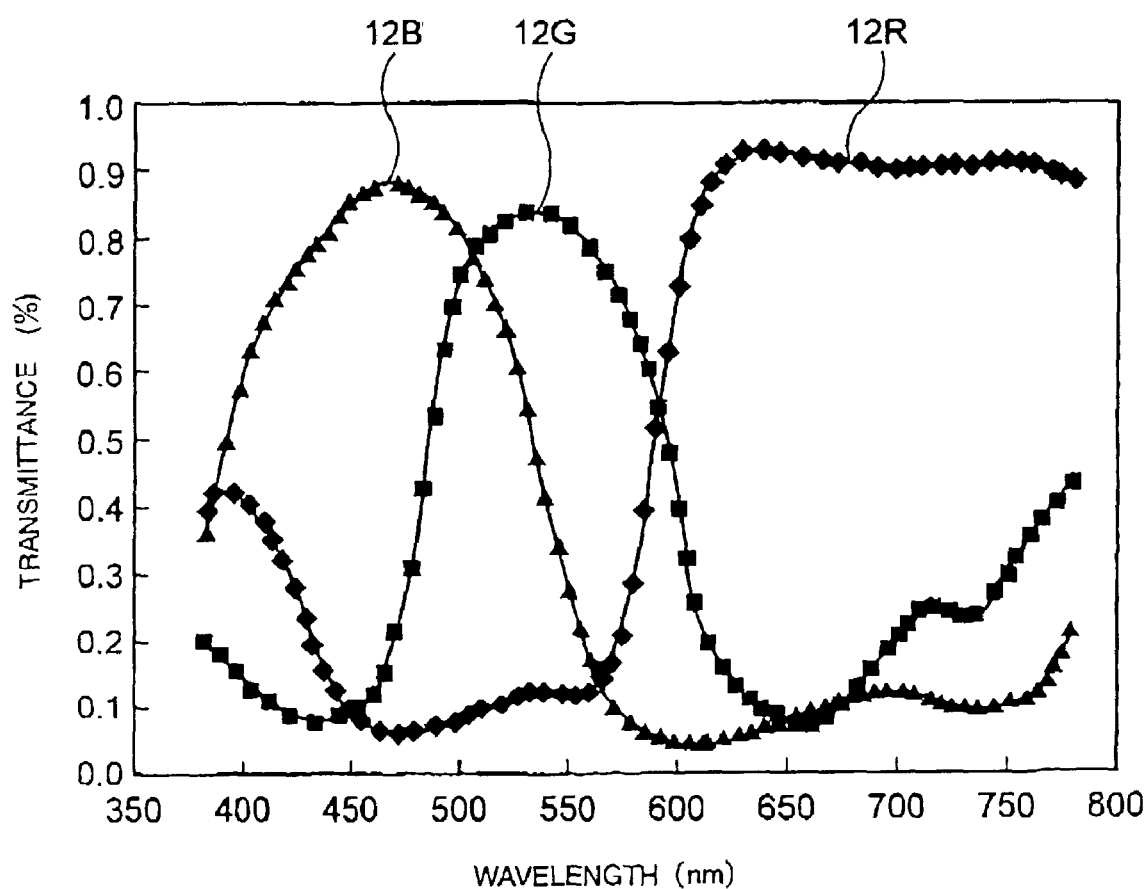
FIG. 3 is a graph showing transmittance properties of color filters of the liquid crystal panel shown in FIG. 1.

FIG. 3 is a graph showing the transmittance properties of the color filters 12 used in this embodiment. In FIG. 3, the transverse axis represents the wavelength of light incident on the color filters 12, and the vertical axis represents the transmittance (ratio of amount of emitted light to that of incident light). As shown in the figure, the color filter 12R has a high transmittance for light having a wavelength of approximately 600 nm or more corresponding to red color; the color filter 12G has a high transmittance for light having a wavelength of approximately 500 to 600 nm corresponding to green color; and the color filter 12B has a high transmittance for light having a wavelength of approximately 400 to 500 nm corresponding to blue color. In addition, when the maximum transmittances of the color filters 12 shown in FIG. 3 are compared to each other, the maximum transmittance (approximately 0.92) of the color filter 12R for red color is highest, and the maximum transmittance (approximately 0.89) of the color filter 12B for blue color and the maximum transmittance (approximately 0.84) of the color filter 12G for green color are decreased in that order. That is, when each color filter 12 is irradiated with the same amount of light, the amount of light emitted from the color filter 12G for green color is smaller than those emitted from the color filter 12R for red color and the color filter 12B for blue color.

In addition, as shown in FIGS. 1 and 2, a plurality of reflective layers 21 is formed on the internal (the liquid crystal 31 side) surface of the second substrate 20. Each reflective layer 21 is a layer for reflecting light incident from the first substrate 10 side and is a thin film having light reflection properties, which is formed, for example, of a pure metal such as aluminum or silver or an alloy primarily composed of the metal mentioned above. The reflective layer 21 of this embodiment is formed of an alloy containing silver as a primary component, palladium (Pd), and copper (Cu). In addition, the internal surface of the second substrate 20 is roughened to form light scattering structures (irregularities) on the surfaces of the reflective layers 21; however, they are omitted in the figure. In this embodiment, instead of the structure having the irregularities on the surface of each reflective layer 21, a so-called front light-scattering method may be used imparting light-scattering properties to the surface of the polarizer 102 located at the observation side.

Figure 4:
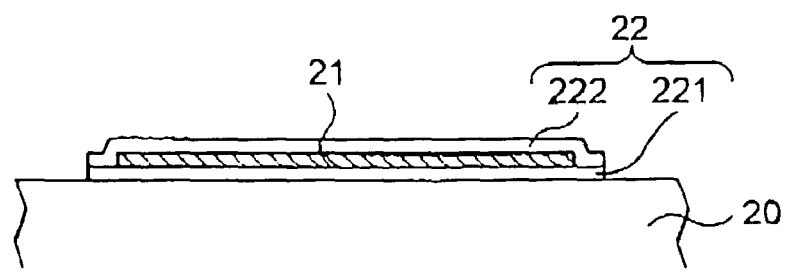
FIG. 4 is a cross-sectional view showing the relationship between the segment electrode and the reflective layer of the liquid crystal panel shown in FIG. 1.

FIG. 4 is a view showing the positional relationship between the reflective layer 21 and the segment electrode 22 and shows a cross-section (that is, a cross-section perpendicular to the extending direction of the segment electrode 22) of the structure when viewed from the line B–B' shown in FIG. 2. As shown in the figure, all around the cross-sectional periphery of the reflective layer 21, which is in the direction perpendicular to the segment electrode 22, is covered with the segment electrode 22. In more particular, as shown in FIG. 4, a first layer 221 forming a part of the segment electrode 22 is formed on the internal surface of the second substrate 20, and the reflective layer 21 is formed so as to cover a part of the first layer 221 in the width direction. In addition, a second layer 222 forming the segment electrode 22 is formed so as to cover the reflective layer 21 from the surface thereof parallel to the second substrate 20 to the peripheries (end surfaces) of the reflective layer 21 in the width direction. According to this structure, the segment electrode 22 and the reflective layer 21 are electrically connected to each other. ITO forming the segment electrode 22 has a relatively high resistance, and in contrast, an APC alloy forming the reflective layer 21 has a low resistance. As a result, since the segment electrode 22 and the reflective layer 21 are in contact with each other as shown in FIG. 4, the wiring resistance can be reduced.

On the surface parallel to the surface of the second substrate 20, the reflective layers 21 are each provided so as to overlap a part of each dot 5, as shown in FIG. 2. In addition, the entire periphery of each reflective layer 21 is located inside the dot 5. In other words, the reflective layers 21 are each disposed in the corresponding dot 5 and are separated from each other to form a matrix pattern.

A region of the dot 5 which overlaps the reflective layer 21 (hereinafter referred to as "reflective region 51") serves as a region reflecting light incident from the first substrate 10 side for performing reflective display. That is, when reflective display is performed, outside light such as sunlight or interior illumination light incident on the liquid crystal panel 1 from the observation side is placed in a predetermined polarized state after passing through the polarizer 102 and the retardation film 101 and then reaches the reflective layer 21 after passing through the first substrate 10, the color filter 12, the common electrode 14, the liquid crystal 31, and the segment electrodes 22 in that order. Subsequently, the light is reflected from the surface of the reflective layer 21 and then retraces the route through which it passed. In this step, in accordance with the difference in voltage between the common electrode 14 and the segment electrode 22, the orientation of the liquid crystal 31 is changed, and hence the amount of a part of the reflective light reflected from the reflective region 51, which passes through the polarizer 102 and is viewed by the observer, can be controlled in each dot 5.

On the other hand, a region of the dot 5 other than the reflective region 51, that is, a region (hereinafter referred to as "transmissive region") 52 of the dot 5 other than the region covered with the reflective layer 21, serves as a region transmitting light therethrough, which light is incident from the backlight unit 4 on the second substrate 20, for performing transmissive display. That is, when transmissive display is performed by turning on the light source 41 of the backlight unit 4, light emitted from the backlight unit 4 is placed in a predetermined polarized state after passing through the polarizer 202 and the retardation film 201. Subsequently, after passing through the second substrate 20, (the transmissive region 52), the segment electrode 22, the liquid crystal 31, the common electrode 14, the color filter 12, and the first substrate 10 in that order, the light is emitted to the observation side. In this transmissive display, in accordance with the difference in voltage between the common electrode 14 and the segment electrode 22, the orientation of the liquid crystal 31 is changed, and hence the amount of a part of the light passing through the transmissive region 52, which passes through the polarizer 102 and is viewed by the observer, can be controlled in each dot 5.

Figure 5:
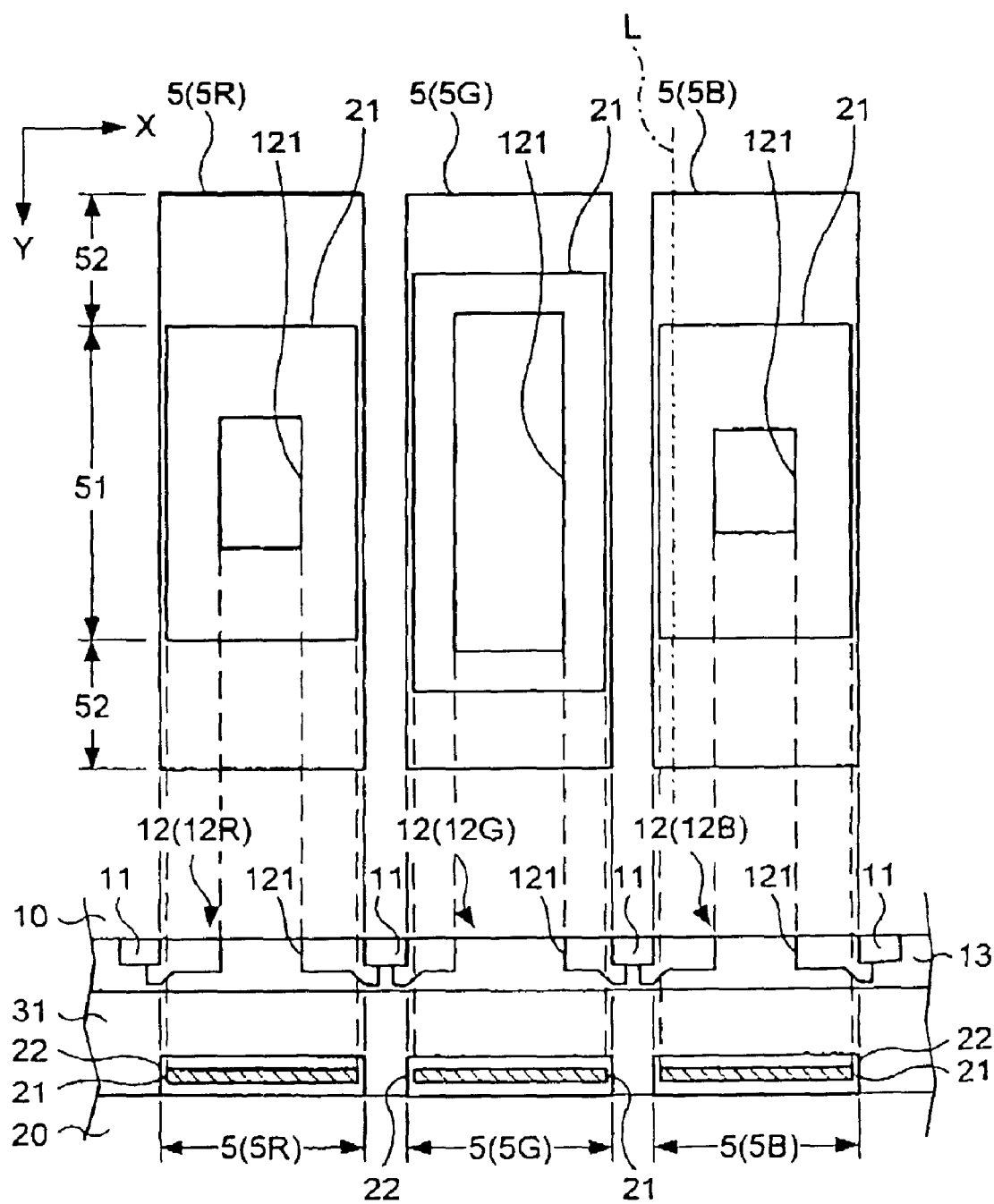
FIG. 5 includes a plan view and a cross-sectional view showing the positional relationship among dots, the color filters, and the reflective layers of the liquid crystal panel shown in FIG. 1.

Next, referring to FIG. 5, detailed structures of the reflective layers 21 and the color filters 12 will be described. In FIG. 5, the dots 5 for three colors forming one pixel are only shown.

As described above, each dot 5 has the reflective region 51 which corresponds to the reflective layer and which reflects light incident form the first substrate 10 side by the reflective layer 21 and the transmissive region 52 which corresponds to a region other than the reflective layer 21 and which transmits light incident from the second substrate 20 side to the first substrate 10 side. As shown in FIG. 5, in each color filter 12, the opening portion 121 is provided in a region of the dot 5 corresponding to the reflective region 51. The opening portion 121 is a portion in which the color filter 12 is not provided, and in this opening portion 121, the transparent overcoat layer 13 covering the color filters 12 and the shading layer 11 is filled. In the structure described above, in a reflective display mode, when a part of light reflected from the surface of the reflective layer 21 passes through the color filter 12 (portion other than the opening portion 121), the amount of the light is decreased by the presence of this color filter 12; however, on the other hand, light, passing through the opening portion 121 and then being emitted to the first substrate 10 side, only passes through the transparent overcoat layer 13, and hence the amount of the light is not substantially decreased. Accordingly, for example, even when the transmittance of the color filter 12 is increased in order to secure the chroma in a transmissive display mode (that is, the amount of pigment or dye dispersed in the color filter 12 is increased), the amount of light used for reflective display can be sufficiently secured, and hence bright display can be performed. As described above, according to this embodiment, both the brightness in a reflective display mode and the chroma in a transmissive display mode can be obtained.

Next, in this embodiment, as shown in FIG. 5, the areas of the opening portions 121 formed in the color filters 12 having different colors are different from each other. That is, the area of the opening portion 121 provided in the green color filter 12G is larger than that of each of the red color filter 12R and the blue color filter 12B. As described above with reference to FIG. 3, the maximum transmittance of the green color filter 12G is lower than that of each of the red color filter 12R and the blue color filter 12B. That is, the areas of the opening portions 121 of the individual color filters 12 are determined in accordance with the difference in transmittance properties of the color filters 12.

In addition, as shown in FIGS. 2 and 5, the areal ratios of the reflective region 51 to the transmissive region 52 are different among the color filters 12 in accordance with the transmittance properties thereof. In other words, the areas of the reflective layers 21 corresponding to the individual dots 5 are different from each other in accordance with the colors therefor. In particular, the area of the reflective region 51 (or the reflective layer 21) corresponding to the green dot 5G is larger than that of each of the reflective regions 51 (or the reflective layer 21) corresponding to the red and the blue dots 5R and 5B.

As described above, when the areas of the opening portions 121 of the color filters 12 and the areas of the reflective layers 21 are made different in accordance with the colors for the dots 5, the difference in transmittance properties among the individual color filters 12 can be compensated, and hence advantage can be obtained in that superior display quality can be obtained. Hereinafter, this advantage described above will be described in detail.

First, the area of the opening portion 121 provided in each color filter 12 will be described. Since the maximum transmittance of the green color filter 12G is low as compared to that of each of the filters 12 for the other colors, when the opening portions 121 of all the color filters 12 are assumed to have the same area, the amount of light passing through the green color filter 12G is smaller than that of each of the red and the blue color filters 12R and 12B. Accordingly, in a reflective display mode, the amounts of light for individual colors, red, green, and blue viewed by the observer vary from each other, and as a result, it becomes difficult to realize superior color reproducibility. On the other hand, in this embodiment, since the opening portion 121 having a large area is formed in the green color filter 12, which has a low transmittance, as compared to the area of the opening portion 121 of each of the other color filters 12R and 12B, the amounts of light for individual colors, red, green, and blue viewed by the observer can be well balanced in a reflective display mode.

Next, the area of the reflective layer 21 of each dot 5 will be described. Since the maximum transmittance of the green color filter 12G is low as compared to that of each of the filters 12 for the other colors, when the reflective regions 51 of the dots for all colors are assumed to have the same area, the amount of light, which is reflected from the surface of the reflective layer 21 corresponding to the green dot 5 and is then emitted to the observer side, is smaller than the amount of light which is reflected from the surface of the reflective layer 21 corresponding to each of the dots 5 for the other colors and is then emitted to the observer side. Accordingly, the amounts of light for individual colors viewed by the observer vary from each other. On the other hand, in this embodiment, since the reflective layer 21 corresponding to the green dot 5G has a large area as compared to that of each of the reflective layers 21 corresponding to the other dots 5R and 5B, the amount of light, which is reflected from the surface of the reflective layer 21 corresponding to the green dot 5G and is then emitted to the observer side, can be sufficiently secured.

As described above, according to this embodiment, even when the transmittance properties of the color filters 12 for various colors vary from each other, the variation can be compensated, and hence superior color reproducibility can be realized.

Referring again to FIG. 5, the positional relationship of the reflective region 51 and the transmissive region 52 in the dot 5 will be described. In this embodiment, both the reflective region 51 and the transmissive region 52 are provided adjacent to a pair of sides, extending in the Y direction, among four sides (that is, four sides forming the periphery of the dot 5) defining the dot 5, and are adjacent to each other along the pair of sides described above. That is, along each of the two long sides of the dot 5 in an approximately rectangular shape from one end to the other end thereof, the transmissive region 52, the reflective region 51, and the transmissive region 52 are provided adjacent to each other in that order. In other words, as shown in FIG. 5, when a linear line L, which is adjacent to the long side of the dot 5 and is parallel thereto, is assumed in the dot 5, the linear line L passes through both the reflective region 51 and the transmissive region 52.

As described above, in this embodiment, since the reflective region 51 and the transmissive region 52, which correspond to one dot 5, are provided adjacent to each other along the periphery of the dot 5, variation in areal ratio of the reflective region 51 to the transmissive region 52 in the dot 5, which is caused by manufacturing errors, can be suppressed. The details will be described below.

As the structure in which the reflective region 51 and the transmissive region 52 are formed in one dot 5, for example, the structure shown in FIG. 6(a) may also be considered. That is, the periphery of the reflective layer 21 corresponding to the dot 5 is formed so as not to be adjacent to the periphery of the dot 5, in other words, the reflective layer 21 is formed so that only the transmissive region 52 is formed adjacent to the periphery of the dot 5.

Figure 6:
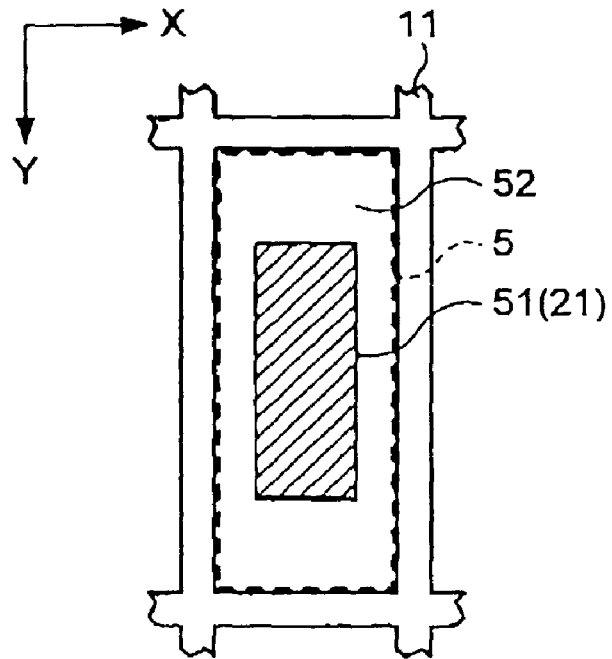
FIG. 6 includes views showing examples for illustrating en effect of the first embodiment for the sake of comparison.
Figure 6:
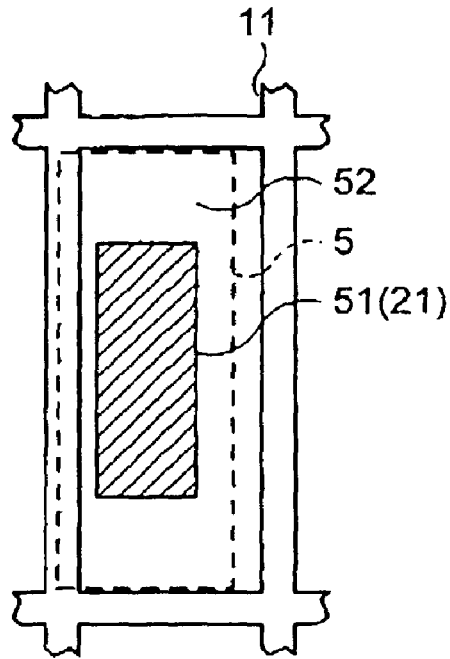

Next, among steps of manufacturing the liquid crystal panel 1 having the structure described above, a step of bonding the second substrate 20 on which the reflective layers 21 are provided and the first substrate 10 on which the shading layer 11 is formed to each other will be described. In this step, in general, the substrates described above are bonded to each other while being relatively aligned. In this step, for example, assuming that the relative position between the two substrates in the X direction is misaligned by the reasons relating to manufacturing techniques or the like, a part of the transmissive region 52 of the dot 5 is covered with the shading layer 11, as shown in FIG. 6(b). Since the part of the transmissive region 52 covered with the shading layer 11 as described above becomes unable to perform display, the area of the transmissive region 52 in the dot 5 becomes small as compared to the case in which the shading layer 11 is appropriately disposed (that is, the case shown in FIG. 6(a)). On the other hand, since the reflective region 51 is not adjacent to the periphery of the dot 5, even when the relative position between the substrates is misaligned as described above, the reflective region 51 is not covered with the shading layer 11. That is, the area of the reflective region 51 in the dot 5 is not changed from that shown in FIG. 6(a). As described above, in the structure shown in FIG. 6, due to the error caused by misalignment between the substrates, since the area of the transmissive region 52 is decreased and the area of the reflective region 51 is not changed, the areal ratio of the reflective region 51 to the transmissive region 52 becomes different from that determined beforehand. As a result, the brightness may vary in accordance with a display mode in some cases; hence, for example, the brightness in a transmissive display mode becomes dark as compared to that in a reflective display mode.

On the other hand, in this embodiment, the reflective region 51 and the transmissive region 52 are formed in the vicinity of the plurality of sides defining one dot 5 and are adjacent to each other along the sides thereof. As a result, when the relative position between the first substrate 10 and the second substrate 20 is misaligned in the X direction with respect to an appropriate position (a designed position) shown in FIG. 7(a), as shown in FIG. 7(b), in addition to the area of the transmissive region 52, the area of the reflective region 51 is also decreased. That is, according to this embodiment, even when the relative position between the reflective region 51 and the shading layer 11 is misaligned, the case in which only one of the areas of the transmissive region 52 and the reflective region 51 is decreased can be avoided, and hence the change in areal ratio of the reflective region 51 to the transmissive region 52 from a predetermined ratio can be suppressed.

Second Embodiment

Next, a liquid crystal panel according to a second embodiment of the present invention will be described.

In the first embodiment, the structure in which the shading layer 11, the color filters 12, and the overcoat layer 13 are provided on the first substrate 10 located at the observation side is described by way of example. In this embodiment, the structure in which the elements described above are provided on the second substrate 20 is formed.

Figure 8:
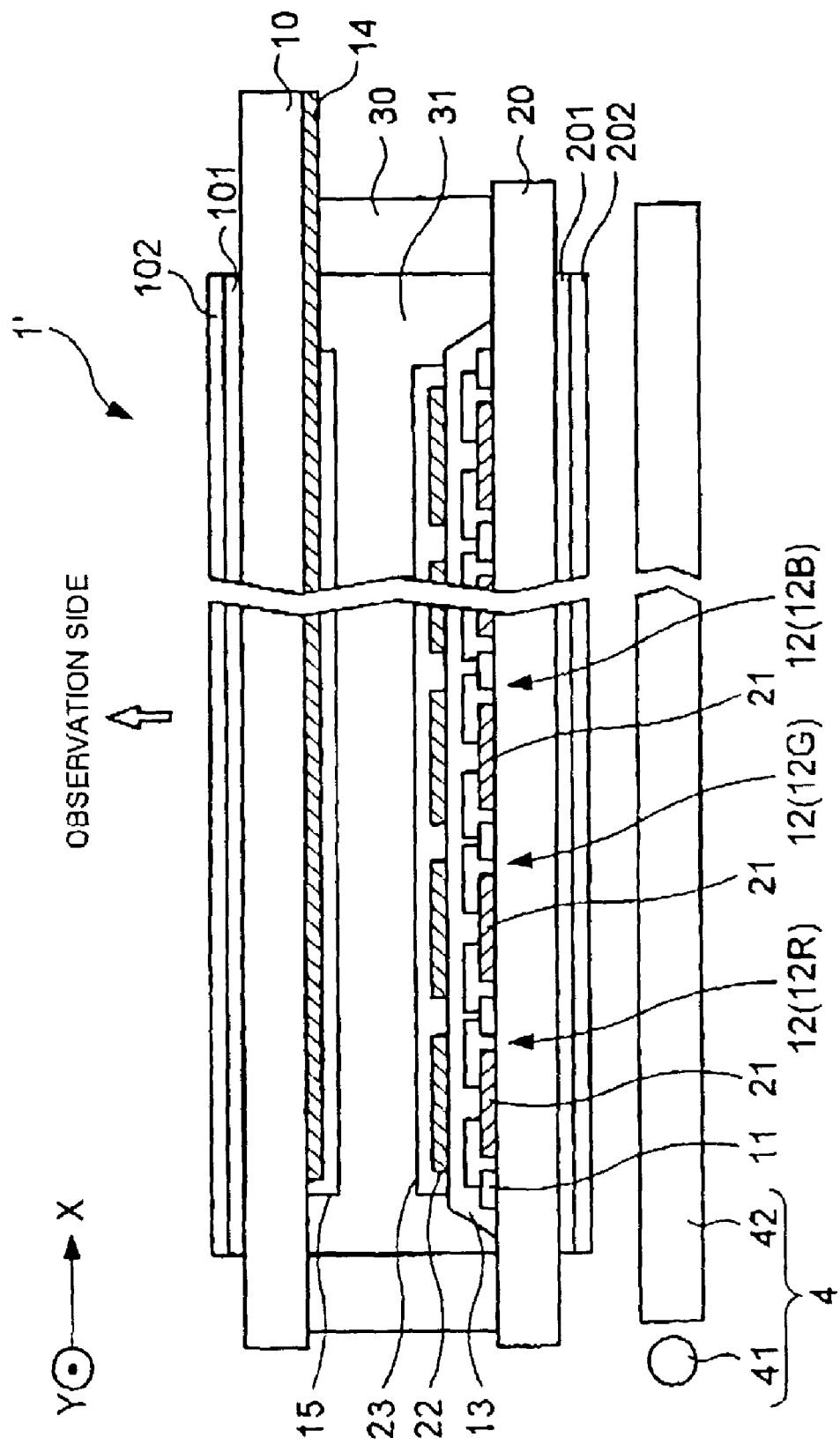
FIG. 8 is a cross-sectional view showing the structure of a liquid crystal panel according to a second embodiment of a liquid crystal display device of the present invention.
Figure 9:
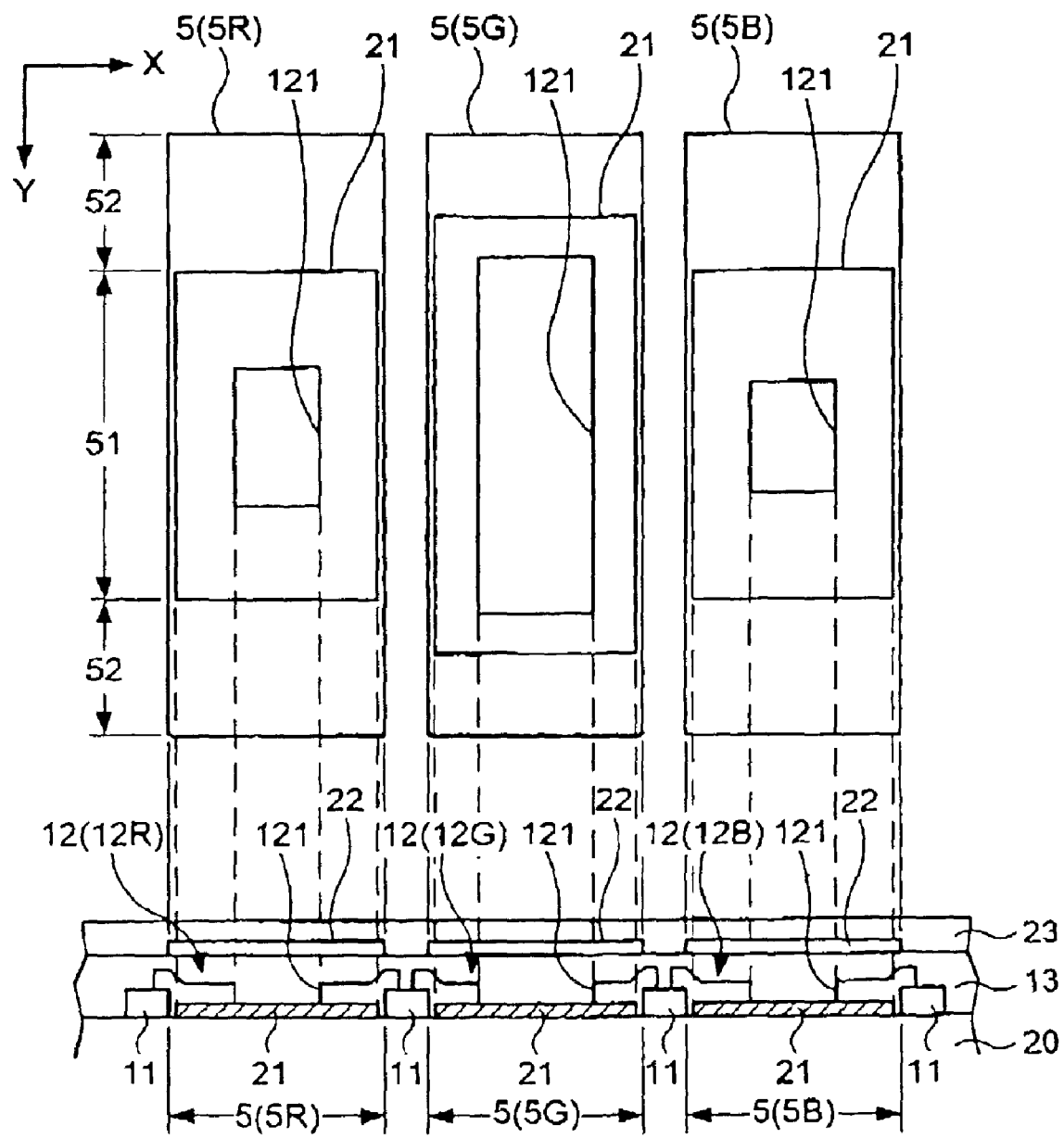
FIG. 9 includes a plan view and a cross-sectional view showing the positional relationship between dots, color filters, and reflective layers of the liquid crystal panel shown in FIG. 8.

FIG. 8 is a cross-sectional view showing the structure of the liquid crystal panel of this embodiment, and FIG. 9 includes a plan view and a cross-sectional view showing the positional relationship between dots, color filters and reflective layers in the liquid crystal panel. The same reference numerals of the constituent elements of the liquid crystal panel 1 according to the first embodiment designate the equivalent constituent elements shown in FIGS. 8 and 9.

As shown in FIGS. 8 and 9, on the second substrate 20, a plurality of the reflective layers 21 of the respective dot 5 are formed. These reflective layers 21 are equivalent to those described in the above first embodiment. That is, the reflective layers 21 are each formed inside the periphery of the dot 5 as shown in FIG. 9; the shapes thereof are each determined so that the reflective region 51 and the transmissive region 52 are adjacent to each other and are provided along the periphery of the corresponding dot 5; and the area of the reflective layer 21 corresponding to the green dot 5G is smaller than that of each of the reflective layers 21 corresponding to the dots 5R and 5B for the other colors.

In addition, on the surface of the second substrate 20 on which the plurality of reflective layers 21 are formed, the shading layer 11 overlapping the gaps formed between the dots 5 and the color filters 12 (12R, 12G, and 12B) having colors corresponding to the individual dots 5 are provided. As shown in FIG. 9, in each color filter 12, the opening portion 121 is formed in a region corresponding to the reflective region 51. As in the above first embodiment, the areas of the opening portions 121 for the dots 5 corresponding to different colors are different. That is, as shown in FIG. 9, the area of the opening portion 121 corresponding to the green dot 5 is larger than that of each of opening portions 121 corresponding to the red and the blue dots 5R and 5B.

Furthermore, the surface of the second substrate 20 on which the reflective layers 21, the shading layer 11, and the color filters 12 are provided is covered with the overcoat layer 13, and on the surface of this overcoat layer 13, the segment electrodes 22 are formed. These segment electrodes 22 has the structure different from that shown in FIG. 4 (the structure composed of the first layer 221 and the second layer 222) and are each formed of a single layer of a transparent conductive material. The surface of the overcoat layer 13 on which the segment electrodes 22 are provided is covered with the alignment film 23.

On the other hand, as shown in FIG. 8, on the internal surface of the first substrate 10, the common electrodes 14 are formed, and these common electrodes 14 are covered with the alignment film 15. In the cross-sectional view shown in FIG. 9, the individual elements on the first substrate 10 are omitted.

Figure 7:
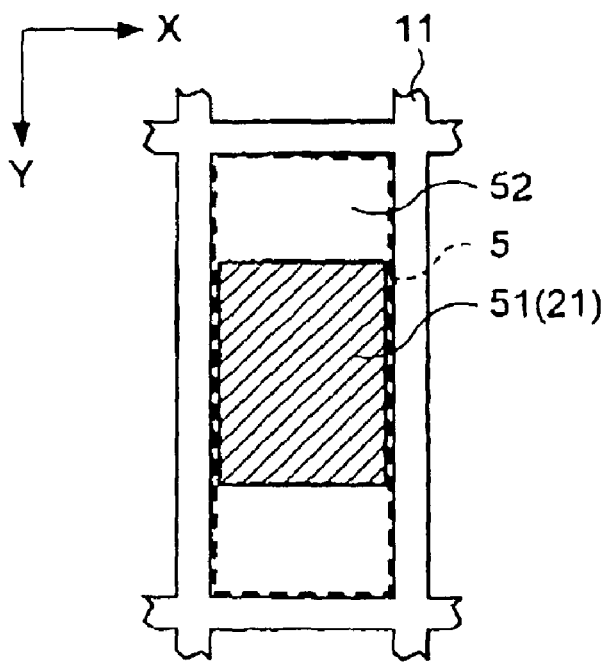
FIG. 7 includes views for illustrating effects of the first embodiment.
Figure 7:
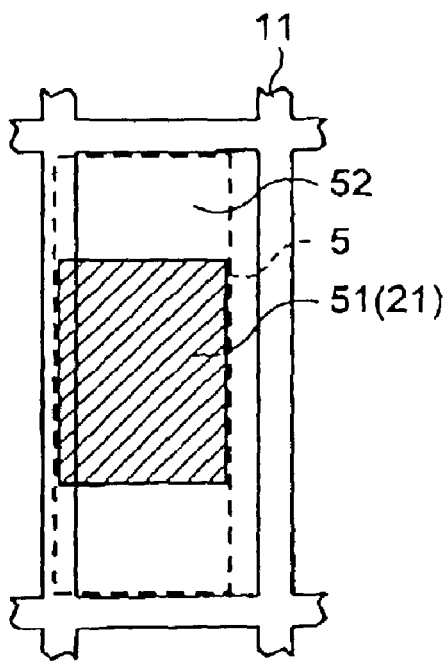

By the structure in which the shading layer 11, and the color filters 12 are provided on the second substrate 20 as described above, the same advantages as described in the above firs embodiment can also be obtained. That is, as described in the first and the second embodiments, regardless of whether the color filters 12 are provided on the first substrate 10 located at the observation side or the second substrate 20 located at the rear surface side, the present invention can be applied. However, since the shading layer 11 or the color filters 12 are generally formed with relatively high accuracy using photolithographic technique, etching technique, and the like, the case in which the relative position between the reflective layers 21 and the shading layer 11 is misaligned may be unlikely to occur as compared to the case in which the shading layer 11 is formed on the first substrate 10. In consideration of this situation, the advantage in which the error in areal ratio of the reflective region 51 to the transmissive region 52 can be suppressed, which is described with reference to FIGS. 6 and 7, is particularly significant when the shading layer 11 (and the color filters 12) is formed on the first substrate 10.

Modified Embodiments

Heretofore, the first and the second embodiments have been described; however, the above embodiments are described by way of example, and various modifications may be performed without departing from the spirit and the scope of the present invention. As modified embodiments, the following embodiments will be described by way of example.

First Modified Embodiment

In the first and the second embodiments described above, in order to compensate for the difference in transmittance properties among the color filters 12 corresponding to different colors, the areas of the reflective layer 21 and the opening portion 121 of the color filter 12G corresponding to the green dot 5G are made different from those corresponding to the red dot 5R and blue dot 5B, and, in addition, the areas of those described above corresponding to the red dot, green dot, and blue dot may be made different from each other. In addition, in the embodiments described above, the areas of the reflective layers 21 and the areas of the opening portions 121 of the color filters 12 corresponding to the individual color dots are made different from each other in accordance with the transmittance properties of the color filters 12, and in addition, the areas described above corresponding to the individual color dots may be made different from each other in accordance with the spectral properties of light emitted from the backlight unit. That is, for example, when the spectral properties of light emitted from the backlight unit 4 vary such that the amount of light having a wavelength corresponding to blue is smaller than each of the amounts of light having wavelengths corresponding to green an red, the transmissive region 52 of the dot 5B having a large area may be secured by decreasing the area of the reflective layer 21 corresponding to the blue dot 5B so that the area described above is made smaller than that of each of those corresponding to the dots 5 for the other colors. As described above, the parameters for determining the area of the reflective layer 21 and the area of the opening portion 121 of the color filter 12 corresponding to each dot 5 are not limited to the transmittance properties of the color filters 12. In addition, in the present invention, it is not always necessary that the area of the reflective layer 21 and the area of the opening portion 121 of the color filter 12 in each dot 5 be changed.

Second Modified Embodiment

Figure 10:
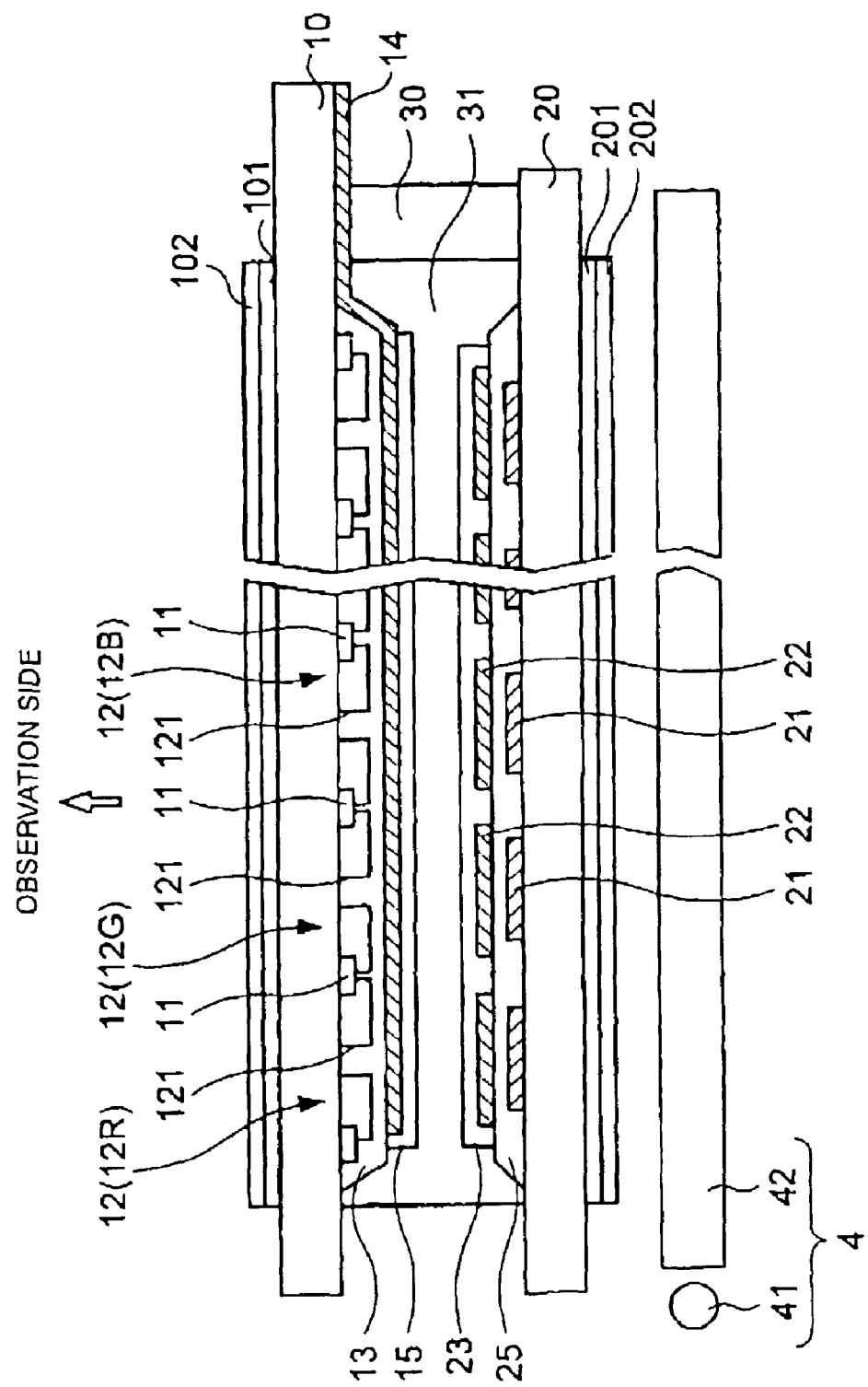
FIG. 10 is a cross-sectional view showing the structure of a liquid crystal panel according to a modified embodiment of the present invention.

In the above first embodiment, as shown in FIG. 4, the structure in which the reflective layer 21 is in contact with the segment electrode 22 is described by way of example; however, they are not always necessary to be in contact with each other. That is, as shown in FIG. 10, the structure may be formed in which the surface of the second substrate 20 on which the reflective layers 21 are provided is covered with an insulating layer 25 formed of a resin material or the like, and on the surface of this insulating layer 25, the segment electrodes 22 composed of single-layered transparent conductive films are formed.

Third Modified Embodiment

In the first and the second embodiment described above, the passive matrix type liquid crystal panel having no switching elements is described by way of example; however, as in the above embodiments, the present invention may be applied to an active matrix type liquid crystal panel provided with two-terminal switching elements such as TFDs (Thin Film Diodes) or three-terminal switching elements such as TFTs (Thin Film Transistors). In addition, in the above embodiments, the stripe pattern in which the color filters 12 having the same color are aligned in a row is described by way of example; however, as the patterns of the color filters 12, in addition to this stripe pattern, a mosaic pattern or a delta pattern may also be used.

Third Embodiment

Figure 11:
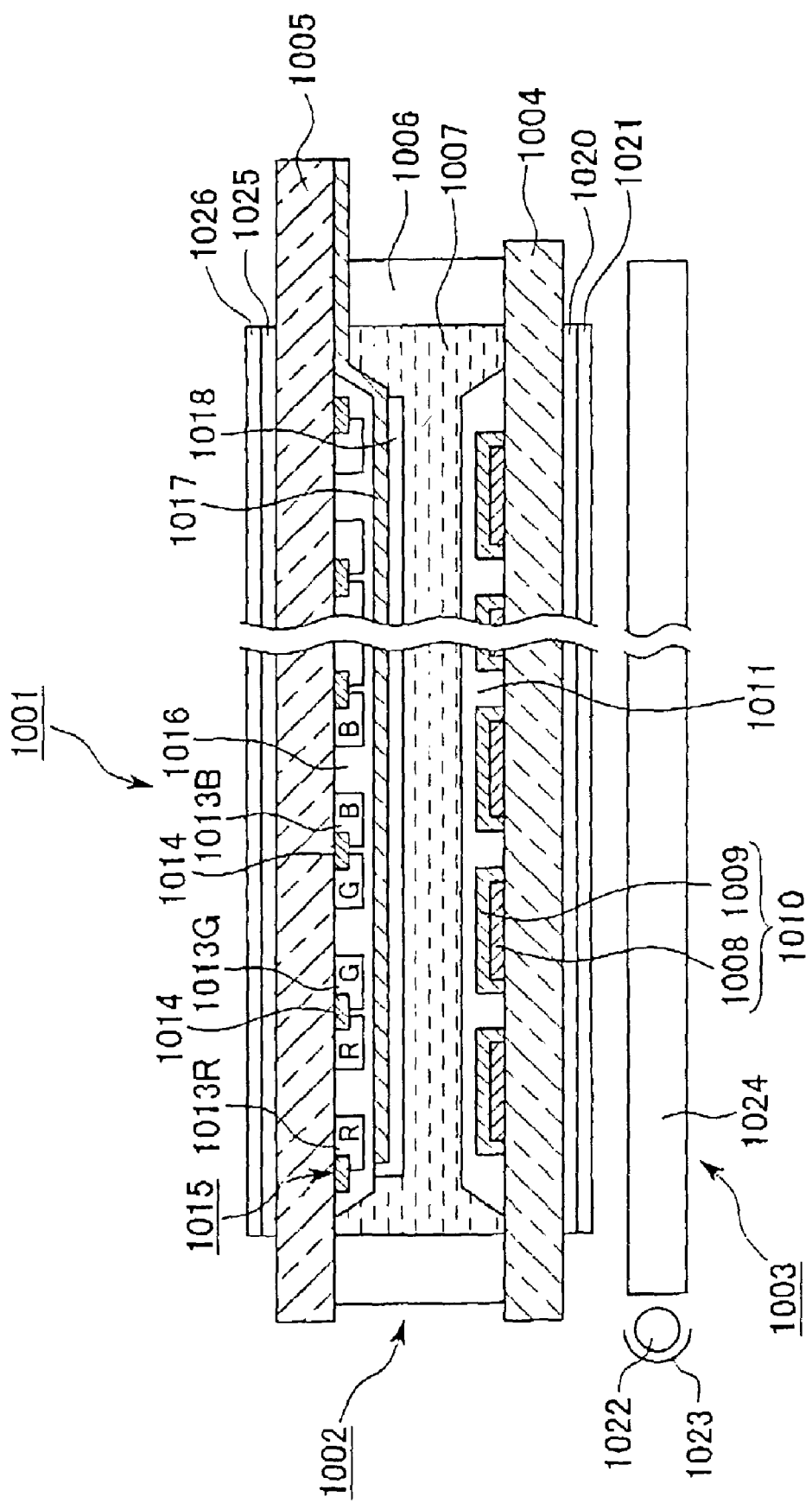
FIG. 11 is a cross-sectional view showing a schematic structure according to a third embodiment of a liquid crystal display device of the present invention.
Figure 12:
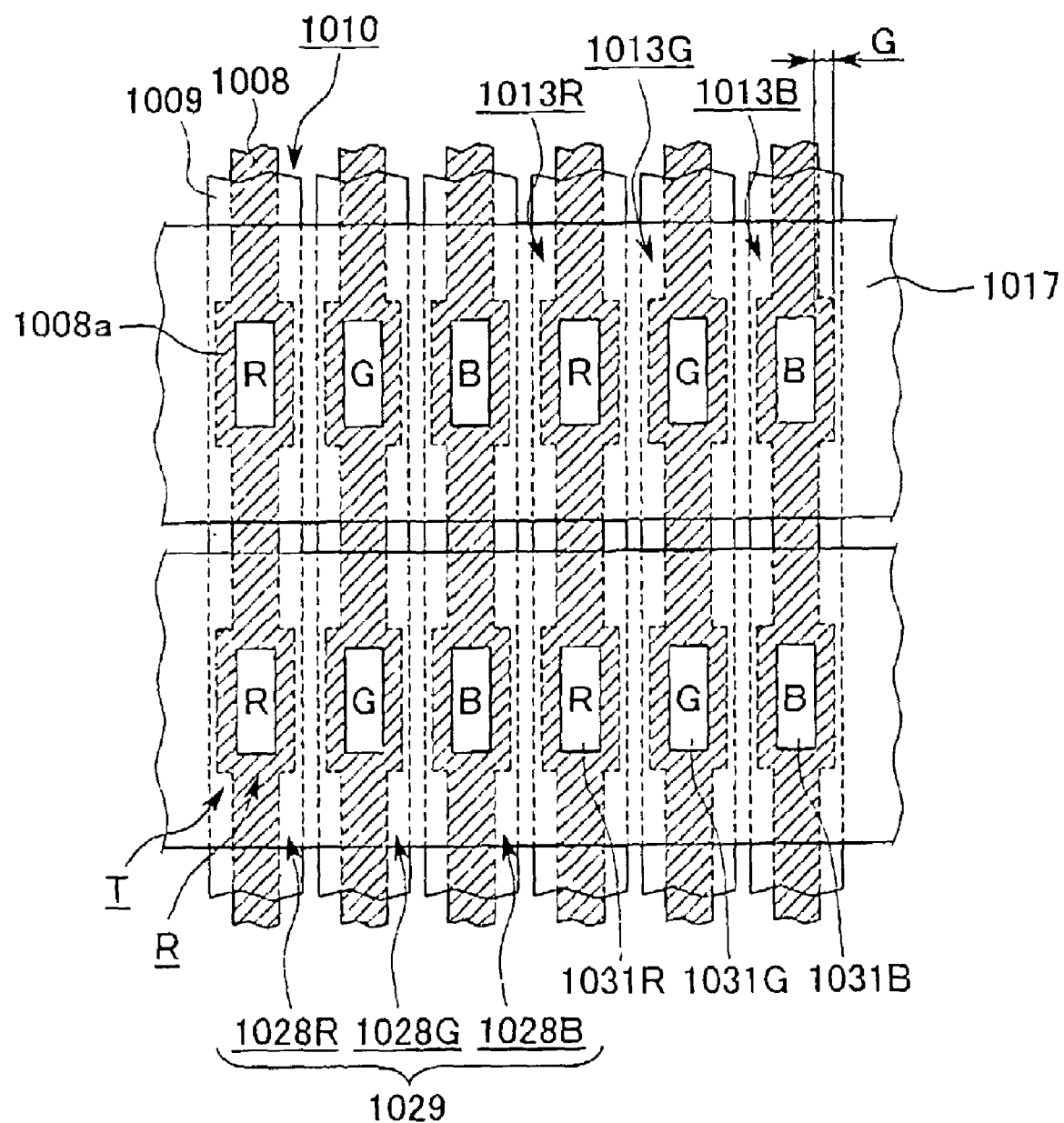
FIG. 12 is an enlarged plan view showing a plurality of pixels forming a display region of the liquid crystal display device shown in FIG. 11.

Next, a third embodiment will be described. A liquid crystal display device of the third embodiment is an example of a passive matrix type transflective color liquid crystal display device. FIG. 11 is a schematic cross-sectional view showing the structure of the liquid crystal display device of the third embodiment, and FIG. 12 is an enlarged plan view of a plurality of pixels forming a display region.

As shown in FIG. 11, a liquid crystal display device 1001 of the third embodiment comprises a liquid crystal cell 1002 and a backlight unit 1003 (lighting means). In the liquid crystal cell 1002, a lower substrate 1004 and an upper substrate 1005 are disposed so as to oppose each other with a sealing material 1006 provided therebetween; a liquid crystal layer 1007 composed of STN (Super Twisted Nematic) liquid crystal or the like is enclosed in the space surrounded by the upper substrate 1005, the lower substrate 1004, and the sealing material 1006; and the backlight unit 1003 is disposed at the rear surface side (outer surface side of the lower substrate) of the liquid crystal cell 1002.

On the internal surface side of the lower substrate 1004 composed of a light transparent material such as glass or plastic, segment electrodes 1010 having a two-layered structure are formed in a strip shape extending in the direction penetrating the plane. Each of the segment electrodes comprises a reflective metal film 1008 having a high reflectance and containing aluminum, silver, an alloy thereof, or the like, and a transparent conductive film 1009 formed of indium tin oxide (hereinafter referred to as "ITO") or the like and provided on the reflective film 1008. On the segment electrodes 1010, an alignment film 1011, which is composed, for example, of a polyimide resin and whose surface is processed by rubbing treatment, is formed. In the structure of the segment electrode 1010 of this embodiment, the transparent conductive film 1009 is not only layered on the reflective film 1008, but also has a large pattern width than that of the reflective film 1008 so as to cover the side surfaces of the reflective film 1008 in addition to the upper surface thereof.

On the internal surface side of the upper substrate 1005 composed of a transparent material such as glass or plastic, there are provided color filters 1015 which comprise color layers 1013R, 1013G, and 1013B having red color (R), green color (G), and blue color (B), respectively, and a shading portion 1014 (black matrix) defining the color layers 1013R, 1013G, and 1013B and having different color therefrom. The shading portion 1014 is formed, for example, of a resin black or a metal, such as chromium, having a relatively low reflectance. In addition, on the color filters 1015, there is provided an overcoat film 1016 which planarizes steps formed between the color layers 1013R, 1013G, and 1013B and which also protects the surfaces thereof. The overcoat film 1016 may be a resin film such as an acrylic or a polyimide film or an inorganic film such as a silicon oxide film. Furthermore, on the overcoat film 1016, there are provided single-layered common electrodes 1017 which are formed of ITO or the like in a strip shape and extend in the direction parallel to the plane. On the common electrodes 1017, an alignment film 1018, which is composed of a polyimide resin or the like and whose surface is processed by rubbing treatment, is formed.

On the outer surface of the lower substrate 1004, a retardation film 1020 and a polarizer 1021 are provided in that order from the substrate side, and in addition, at the outer surface side of the polarizer 1021, the backlight 1003 is provided. The backlight 1003 has a light source 1022 such as a cold cathode tube or a light-emitting diode (LED), a reflective plate 1023, and a light guide 1024. In addition, on the outer surface of the upper substrate 1005, a retardation film 1025 and a polarizer 1026 are provided in that order from the substrate side.

The electrodes on the substrates 1004 and 1005 are disposed as shown in FIG. 12, and on the lower substrate 1004, a plurality of the segment electrodes 1010 is formed in a strip shape extending in the vertical direction shown in FIG. 12. In addition, on the upper substrate 1005, a plurality of the common electrodes 1017 are formed in a strip shape extending in the lateral direction shown in FIG. 12 so as to perpendicularly intersect the segment electrodes 1010. The color layers 1013R, 1013G, and 1013B for R, G, and B, respectively, of the color filter 1015 are disposed along the extending segment electrodes 1010. That is, the color filters 1015 of this embodiment form a so-called vertical stripe pattern, and the color layers 1013R, 1013G, and 1013B for R, Q and B, respectively, have a strip shape and extend in the vertical direction. Accordingly, three dots 1028R, 1028G, and 1028B for R, G, and B, respectively, disposed in the lateral direction as shown in FIG. 12 form one pixel 1029 constituting a display pattern. In this embodiment, the dot is a part at which the segment electrode 1010 and the common electrode 1017 intersect each other and is a minimum unit for performing display.

In this embodiment, the reflective film 1008 and the transparent conductive film 1009 form the segment electrode 1010 having the two-layered structure, and of these two films, the reflective film 1008 functions as a reflective film for performing display in a reflective display mode. The reflective film 1008 and the transparent conductive film 1009 both extend in the vertical direction and have the widths different from each other, and as described above, the pattern width of the transparent conductive film 1009 is larger than that of the reflective film 1008. As a result, in each dot 1028R, 1028G, and 1028B, the central portion is a region in which the reflective film 1008 and the transparent conductive film 1009 are present, and this region is a reflective region R used in a reflective display mode of a transflective liquid crystal display device. In addition, each side of the reflective region R is a region in which only the transparent conductive film is present, and this region is a transmissive region T used in a transmissive display mode of a transflective liquid crystal device. That is, in each dot 1028R, 1028G, and 1028B, both the reflective region R and the transmissive region T are present.

In addition, in this embodiment, the width of the reflective film 1008 is not uniformly formed, and at the central portion of each of the dots 1028R, 1028G, and 1028B, width expansion portion 1008a is formed having a larger width than that of the other parts of the film. In addition, the color layers 1013R, 1013G, and 1013B for R, G, and B of the color filter 1015 on the upper substrate 1005 are not provided in the entire area of the respective dot 1028R, 1028G, and 1028B, and an opening portion (white portion shown in FIG. 12) is provided in each of the color layers 1013R, 1013G, and 1013B in the dot 1028R, 1028G, and 1028B, respectively. That is, these opening portions are non-color regions 1031R, 1031G, and 1031B, and in particular, the non-color regions 1031R, 1031G, and 1031B are each formed in a region overlapping the width expansion portion 1008a of the reflective film 1008 in plan view so as to be placed within the width expansion portion 1008a. That is, each of the non-color regions 1031R, 1031G, and 1031B is a region in which only the reflective film 1008 and the transparent conductive film 1009 are present; the reflective region R other than the non-color region is a region in which the reflective film 1008, the transparent conductive film 1009, and one of the color layers 1013R, 1013G, and 1013B of the color filter are present; and the transmissive region T is a region in which the transparent conductive film 1009 and one of the color layers 1013R, 1013G, and 1013B are present. In this embodiment, the width expansion portion 1008a is in an approximately rectangular shape, and the non-color regions 1031R, 1031G, and 1031B are each in an approximately rectangular shape.

In the liquid crystal display device 1001 having the structure described above, in a reflective display mode, since a part of outside light incident from the upper substrate 1005 side passes through the non-color regions 1031R, 1031G, and 1031B in the reflective regions R, the light passing through the color filter 1015 twice in a reflective display mode comprises non-colored light passing through the non-color regions 1031R, 1031G, and 1031B and colored light passing through the color regions. On the other hand, in a transmissive display mode, all the light emitted from the backlight 1003 and passing through the transmissive regions T passes through the color regions, hence all the light passing through the color filter 1015 once in a transmissive display mode is colored light. As described above, the difference in tint of color between light passing through the color filter 1015 twice in a reflective display mode and light passing through the color filter 1015 once in a transmissive display mode can be reduced, and when the color layers 1013R, 1013G, and 1013B of the color filter 1015 are optimized, display exhibiting fine colors in both a reflective and a transmissive display mode and having superior visibility can be obtained.

In addition, in this embodiment, since the transparent conductive film 1019 and the reflective film 1008 form the two-layered segment electrode 1010, due to the presence of the transparent conductive film 1009 located in the transmissive region T, application of an electric field to the liquid crystal layer 1007 above the transmissive region T can be smoothly performed, and in addition, due to the presence of the reflective film 1008 composed of a metal having a small resistivity as compared to that of the transparent conductive film 1009, an effect in that the resistance of the entire segment electrode 1010 is reduced can be obtained.

When the liquid crystal display device having the structure according to the first embodiment is formed using a general method, the areas of the non-color regions are likely to vary, and misalignment between the reflective region and the no-color region is likely to occur. The reasons for this will be described below.

First, as in this embodiment, it is assumed that the reflective film forms a part of a strip-shaped electrode. In this case, as described above, it is preferable that the effects, for example, of reducing the resistance of the electrode can be obtained; however, it is naturally understood that the reflective film must be patterned into a strip shape. Since the reflective region and the transmissive region are formed in one dot in the liquid crystal display device of the first embodiment, for example, it may also be considered that, after a reflective film is formed so as to cover the entire dot, a window portion (transmissive region) for light transmission is formed in the reflective film. However, as described above, since the reflective film described above is also patterned after all into a strip shape, when the width of the metal film pattern is designed to be small as compared to that of the transparent conductive film pattern, the both sides of the metal film automatically become the transmissive regions, and hence design can be easily performed compared to the case in which the window portion is intentionally formed.

Figure 23:
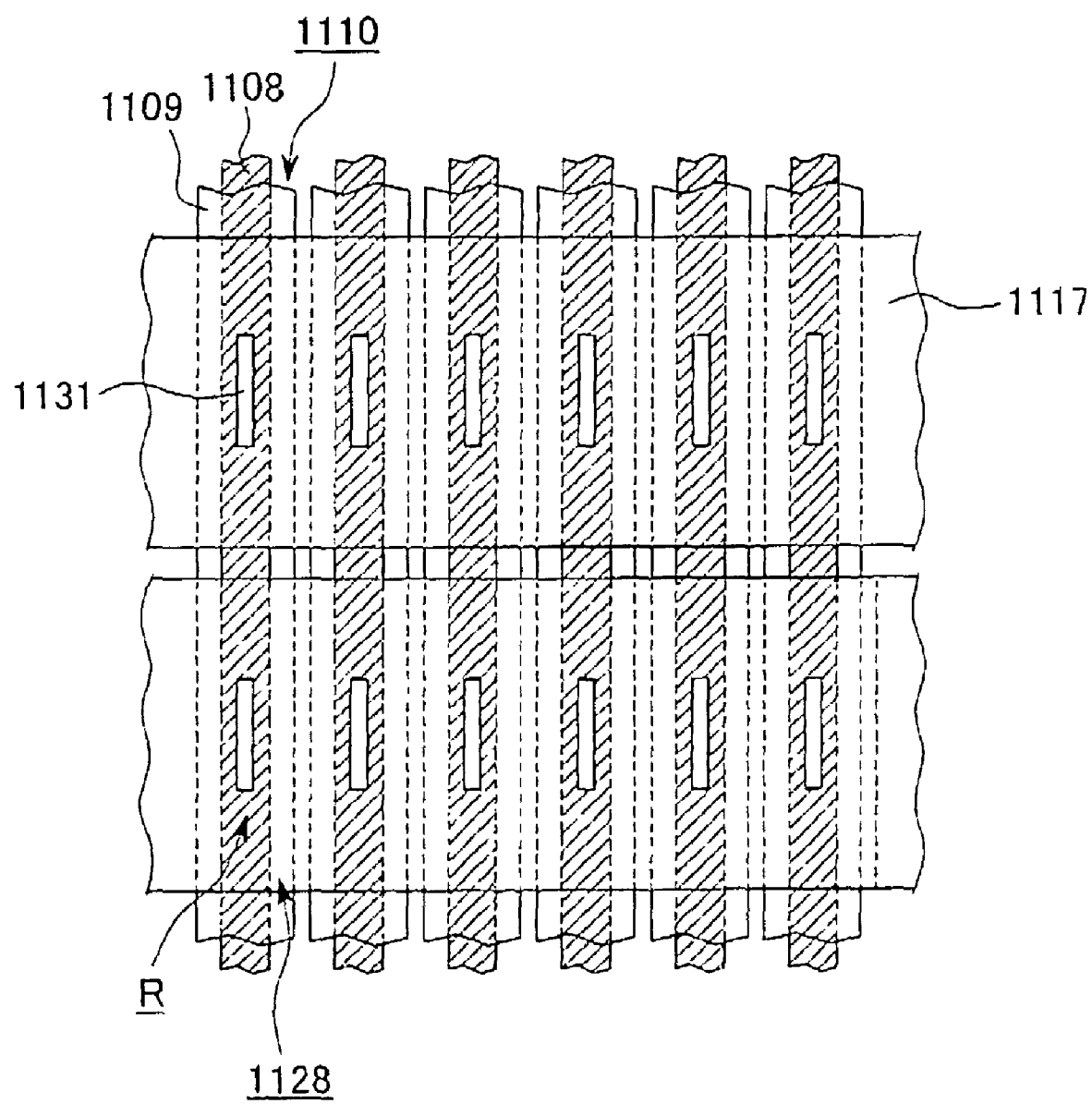
FIG. 23 is an enlarged plan view showing a plurality of pixels forming a display region of a liquid crystal display device, which is already filed by the inventors of the present invention.

That is, according to the easiest pattern design, as shown in FIG. 23, the pattern width of a strip-shaped reflective film 1108 is made small as compared to that of a strip-shaped transparent conductive film 1109 forming a segment electrode 1110. In addition, since the non-color region is provided in the reflective region of the liquid crystal display device according to the first embodiment, a non-color region 1131 (opening portion in the color layer) in which the color layer of the color filter is not present is provided above the reflective film 1108. As shown in FIG. 23, in color liquid crystal display devices, since a dot 1128 itself generally has a rectangular shape having the longer side in the vertical direction, the shape of the reflective region R also has a rectangular shape having the longer side in the vertical direction, and in addition, the non-color region 1131 also has a rectangular shape having the longer side in the vertical direction.

As described above, when the liquid crystal display device of the first embodiment is formed, the shape of the opening portion (non-color region) in the color layer naturally becomes a rectangular having the long side in the vertical direction, and as the area of the opening portion is increased, a rectangular shape having a longer side in the vertical direction is formed. When a color layer having an opening in this type of shape as described above is formed by a photolithographic technique, when variation in dimension is generated by etching, variation in area of the opening portion is increased. The reason for this is that, for example, in the case in which a square pattern and a rectangular pattern having the same area as that thereof are compared to each other, when the same etching error in dimension is generated for the two patterns described above, the change in area of the rectangular pattern becomes larger than that of the square pattern and is also increased as the rectangular pattern has a longer side. As a result, variation in display properties such as the brightness and hue in a reflective display mode is increased. In addition, when the width of the opening portion is excessively decreased, and the dimension thereof exceeds the limit of the resolution of a photolithographic technique, a problem may arise in that the opening portion cannot be formed at all.

In addition, for example, when the reflective film is formed on the lower substrate, and the color filter is formed on the upper substrate, in order to form the non-color region reliably in the reflective region, alignment accuracy between the pattern for the reflective film and that for the color filter, that is, alignment accuracy when the lower substrate is bonded to the upper substrate, becomes important. However, when a non-color region in a rectangular shape having an area to some extent is disposed in a reflective region having a rectangular shape, the distance between the end of the reflective region in the short side direction and the end of the non-color region in the short side direction is inevitably decreased, and as a result, the alignment allowance is decreased. Hence, the case in which, depending on design, the distance between the end of the reflective region and the end of the non-color region may be smaller than the misalignment in a substrate-bonding step in some cases may be considered. In this case, when the non-color region protrudes into the transmissive region, desired optical properties cannot be obtained.

On the other hand, in the liquid crystal display device of this embodiment as shown in FIG. 12, the width expansion portion 1008a of the reflective film 1008 is provided in each of the dots 1028R, 1028G, and 1028B, and in addition, the non-color regions 1031R, 1031G, and 1031B are each disposed to overlap the width expansion portion 1008a in plan view. Accordingly, the reflective region R in which each of the non-color regions 1031R, 1031G, and 1031B is disposed has a shape close to a square shape as compared to that of a conventional reflective region. Hence, when a predetermined variation in etching dimension occurs, variation in area of the opening portion can be decreased as compared to that in the past, and variation in display properties in a reflective display mode can be decreased. In addition, when the reflective region R, in which each of the non-color regions 1031R, 1031G, and 1031B is disposed, has a shape close to a square shape as compared to that in the past, since the distance G between the end of the reflective region R and each end of the non-color regions 1031R, 1031G, and 1031B can be larger than that in the past, the alignment allowance is increased, and hence, in addition to the structure having resistance against bonding misalignment, desired optical properties can also be obtained.

Fourth Embodiment

Hereinafter, a fourth embodiment of the present invention will be described with reference to drawings.

Figure 13:
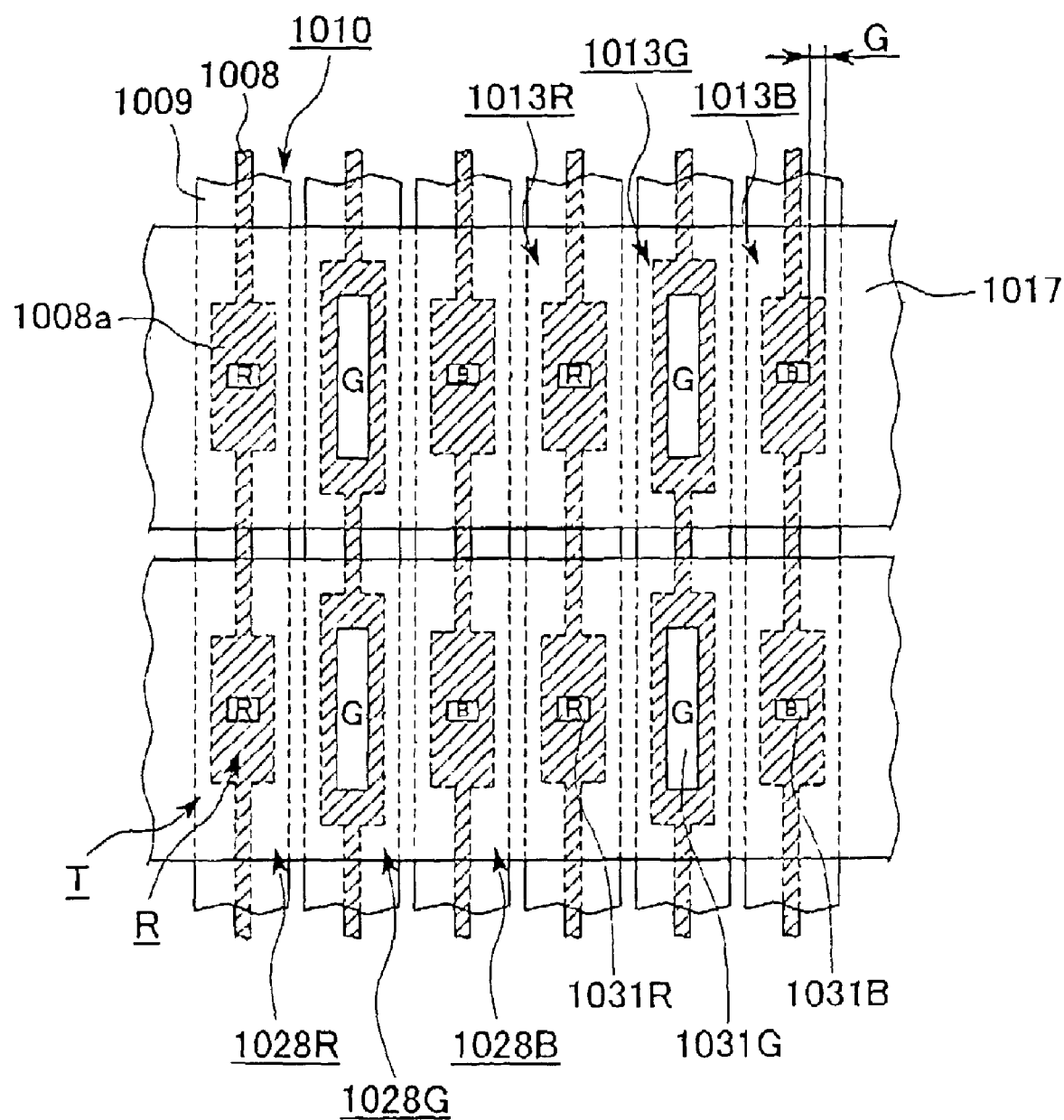
FIG. 13 is an enlarged plan view showing a plurality of pixels forming a display region according to a fourth embodiment of a liquid crystal display device of the present invention.

FIG. 13 is an enlarged plan view of a plurality of pixels forming a display region of a liquid crystal display device of the fourth embodiment, and corresponds to the views shown in FIG. 12 of the third embodiment. The basic structure of the liquid crystal display device of this embodiment is equivalent to that of the third embodiment, and the shapes of a reflective region and a non-color region are only different from those of the third embodiment. The same reference numerals of the constituent elements in FIG. 12 designate the same constituent elements in FIG. 13, and descriptions thereof are omitted.

In the third embodiment, in each of dots corresponding to colors R, G, and B different from each other, the area and shape of the reflective region and the area and the shape of the no-color region are equivalent to each other; however, in this embodiment, among dots corresponding to colors R, G and B different from each other, the area of at least one reflective region and the area of at least one non-color region are different from the others, and accordingly, the shape of the reflective region and the shape of the non-color region are different from the others.

In particular, as shown in FIG. 13, among the dots 1028R, 1028G, and 1028B having different colors from each other, the area of the reflective region R in the dot 1028G for G is largest, and the areas of the reflective region R in the dot 1028B for B and the reflective region R in the dot 1028R for R becomes smaller in that order. In other words, the area of the transmissive region T in the dot 1028G for G is smallest, and the areas of the transmissive region T in the dot 1028B for B and the transmissive region T in the dot 1028R for R becomes larger in that order. In addition, the area of the non-color region 1031G in the dot 1028G for G is largest, and the areas of the non-color region 1031R in the dot 1028R for R and the non-color region 1031B in the dot 1028B for B becomes smaller in that order.

According to the liquid crystal display device of this embodiment, since the reflectances, chromas in a reflective display mode, transmittances, and chromas in a transmissive display mode can be adjusted for individual colors R, q and B, the brightness and color (for example, hue in white display) of display in a reflective display mode and the brightness and color (for example, hue in white display) of display in a transmissive display mode can be optionally adjusted. Accordingly, the display qualities both in a reflective display mode and in a transmissive display mode can be equally optimized.

In more particular, the area of the transmissive region T of the dot 1028G for G is set to smaller than that of each of the transmissive regions T of the dots 1028R for R and 1028B for B. Since green light has a sufficiently high spectral luminous factor as compared to that of each of red color and blue color, although the areas are set as described above, the color balance is not degraded, and in addition, a sufficient transmittance can also be maintained. Furthermore, since the area of the non-color region 1031G of the dot 1028G for G is set to larger than that of each of the non-color regions 1031R and 1031B of the dots 1028R for R and 1028B for B, respectively, the reflectance and color reproducibility in a reflective display mode can be improved.

Figure 14:
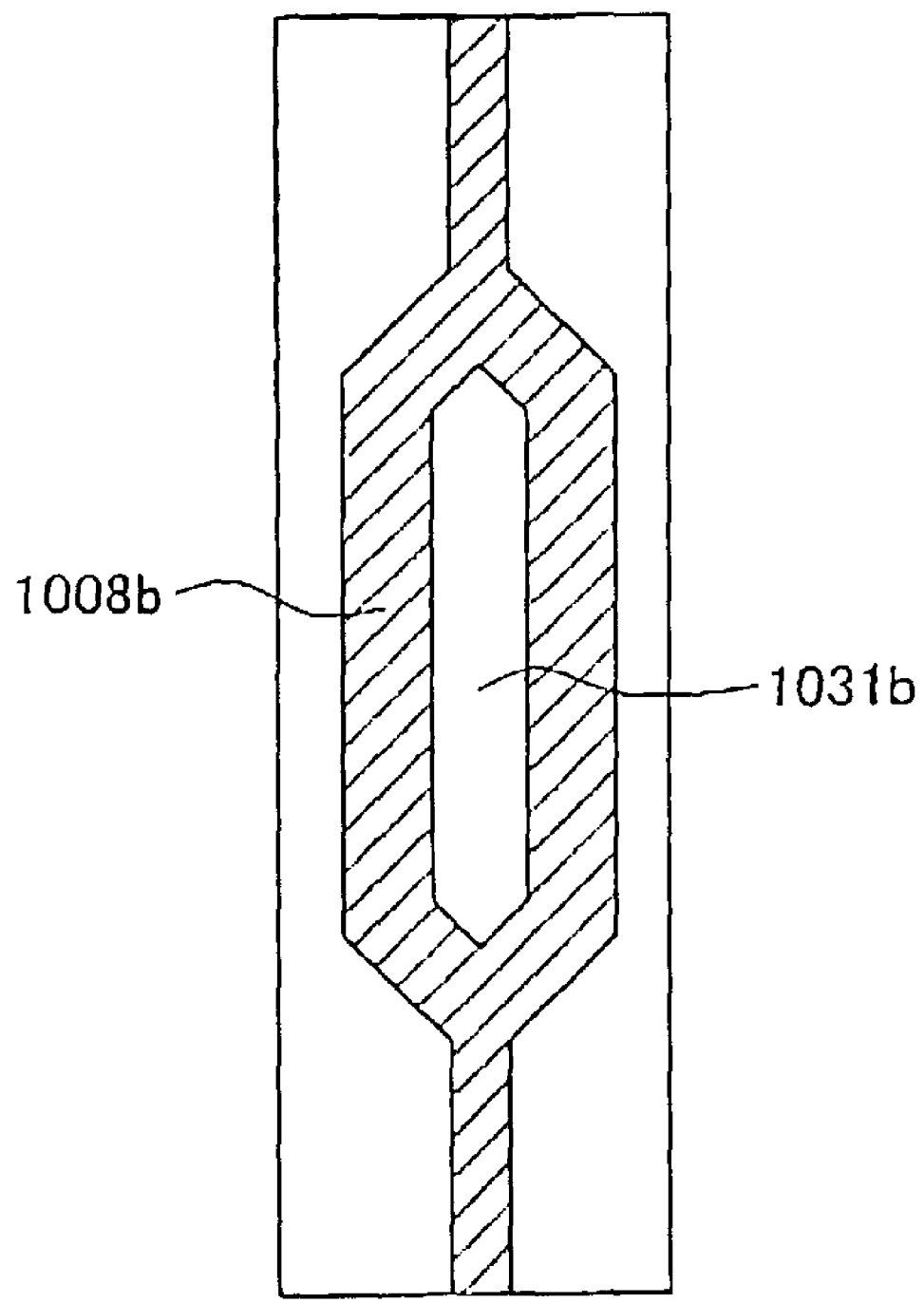
FIG. 14 is a plan view showing another example of an expansion portion of a reflective film of a liquid crystal display device according to the present invention.
Figure 15:
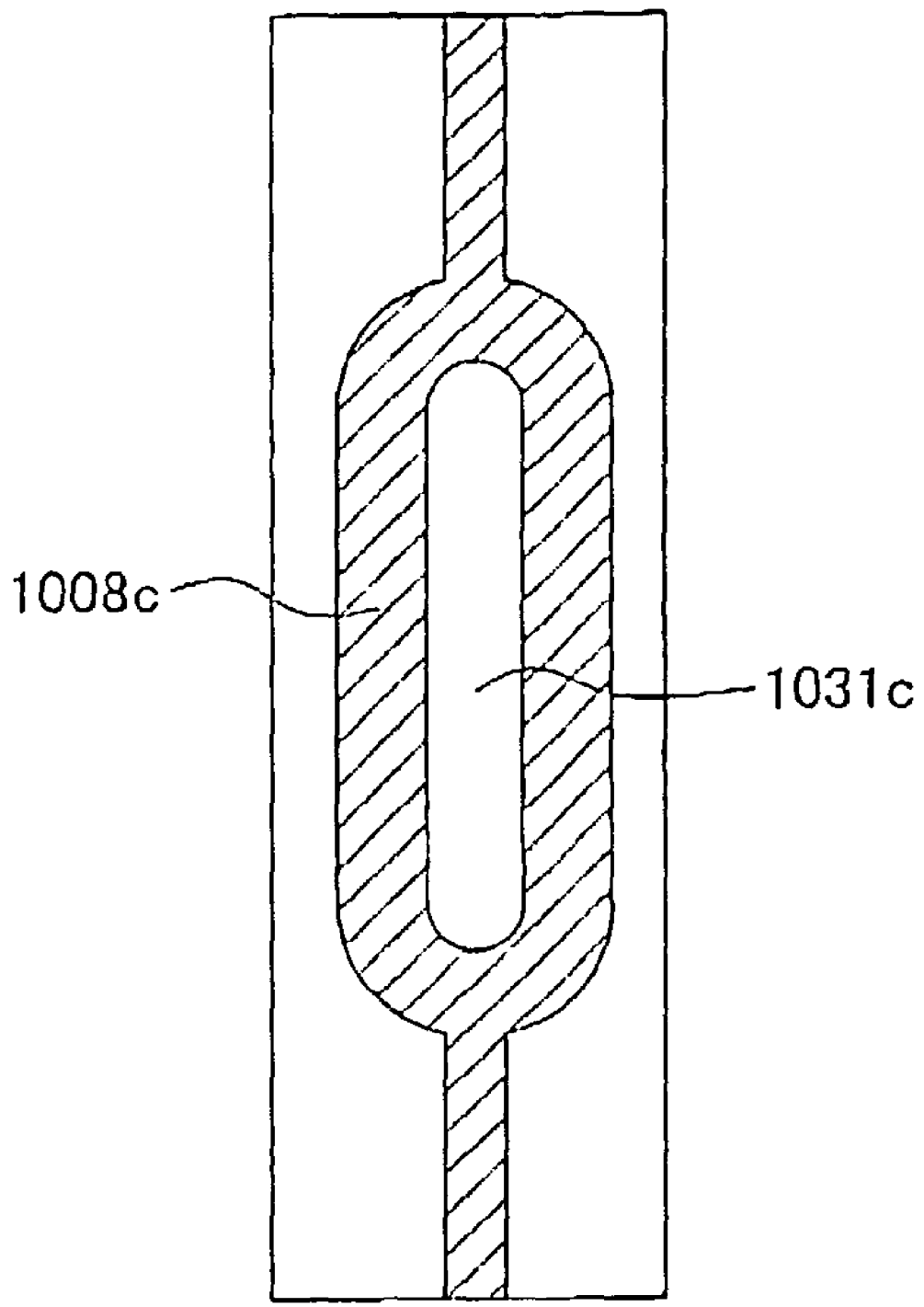
FIG. 15 is a plan view showing still another example of the expansion portion of a reflective film of a liquid crystal display device according to the present invention.

In the third and fourth embodiments described above, the width expansion portion of the reflective film having an approximately rectangular shape and the non-color region having an approximately rectangular shape are described by way of example; however, the shapes thereof are not specifically limited to a rectangular shape. For example, as shown in FIG. 14, the shape of a width expansion portion 1008b may be an approximately hexagon, and accordingly the shape of a non-color region 1031b may also be an approximately hexagon, or as shown in FIG. 15, the shape of a width expansion portion 1008c may be an approximately oval, and accordingly the shape of a non-color region 1031c may also be an approximately oval.

In addition, in the embodiments described above, the structure in which the transparent conductive film is provided on the reflective film to form a two-layered electrode is described by way of example; however, it is not always necessary for a metal film functioning as a reflective film in the present invention to form the electrode, and an insulating film may be provided between the metal film and the transparent conductive film so that the metal film functions exclusively as a reflective film. However, in this case, in the present invention, the metal film must be formed into a strip shape. In addition, in the embodiments described above, the vertical stripe pattern is described as a pattern of the color filters by way of example, and in addition to that, the present invention may also be applied to color filters disposed in a transverse stripe pattern, a mosaic pattern, a delta pattern, or the like. Furthermore, in addition to a passive matrix type liquid crystal display device described in the above embodiments by way of example, the present invention may be applied to an active matrix type liquid crystal display device using TFDs as a switching element.

EXAMPLES

Next, by the inventors of the present invention, simulation of optical properties, such as reflectances, transmittance, and display colors, were performed by changing various parameters using the liquid crystal display device of the present invention, and as a result, the advantages of the present invention were verified. Hereinafter, the results will be described.

As the basic conditions of the simulation, the number of dots was set to 120×3 (R, G and B) rows×160 columns, a dot pitch in the transverse direction was set to 85 µm, and a dot pitch in the vertical direction was set to 255 µm. FIGS. 16 to 19 are views showing dimensions of individual parts of a dot G according to structural examples 1 to 3 described below, and FIG. 20 is a view showing dimensions of individual parts in a pixel of structural example 3 described below. In these figures, a region (meshed region) indicated by the arrow B is a black matrix between dots, and the widths of the black matrix extending in the transverse direction and in the vertical direction were set to 13 and 9 µm, respectively. As a result, a dot pitch area (area of a dot including the black matrix) was set to 21,675 µm², and a dot area (area of a dot excluding the black matrix) was set to 18,392 µm². In addition, a color filter having the spectral properties shown in FIG. 21 was used.

Structural Example 1

In structural example 1, the transmissive regions of dots R, G and B were each formed to have a uniform region of 8,712 µm². In addition, the areas of the non-color regions in the dots R and B were each set to 360 µm², and the non-color region in the dot G was formed to have a large area of 2,161 µm². The reflectance, the area of color region and the white display color in a reflective display mode, the transmittance, and the white display color and the area (area of a triangle formed by three coordinates of red, green, and blue color display in an x-y coordinate system showing chromas) of color region in a transmissive display mode were calculated by simulation. In this example, both the area of color region and the white display color were values based on an xyY color system chromaticity diagram. The optical properties described above are shown in Table 1 below.

Structural Example 2

In structural example 2, in a manner different from that in structural example 1, the areas of the transmissive regions of the individual dots were changed therebetween. That is, the transmissive region of the dot G had a smallest area of 6,776 µm², and the areas of the transmissive regions of dot B and dot R were increased in that order so as to be 10,406 and 11,130 µm², respectively. In addition, concerning the non-color region of each dot, the areas for the dot R and the dot G were set to 180 and 3,240 µm, respectively. In addition, the non-color region was not provided in the dot B. The reflectance, the white display color and the area of color region in a reflective display mode, the transmittance, and the white display color and the area of color region in a transmissive display mode were calculated by simulation. The optical properties described above are shown in Table 1 below.

Structural Example 3

Figure 21:
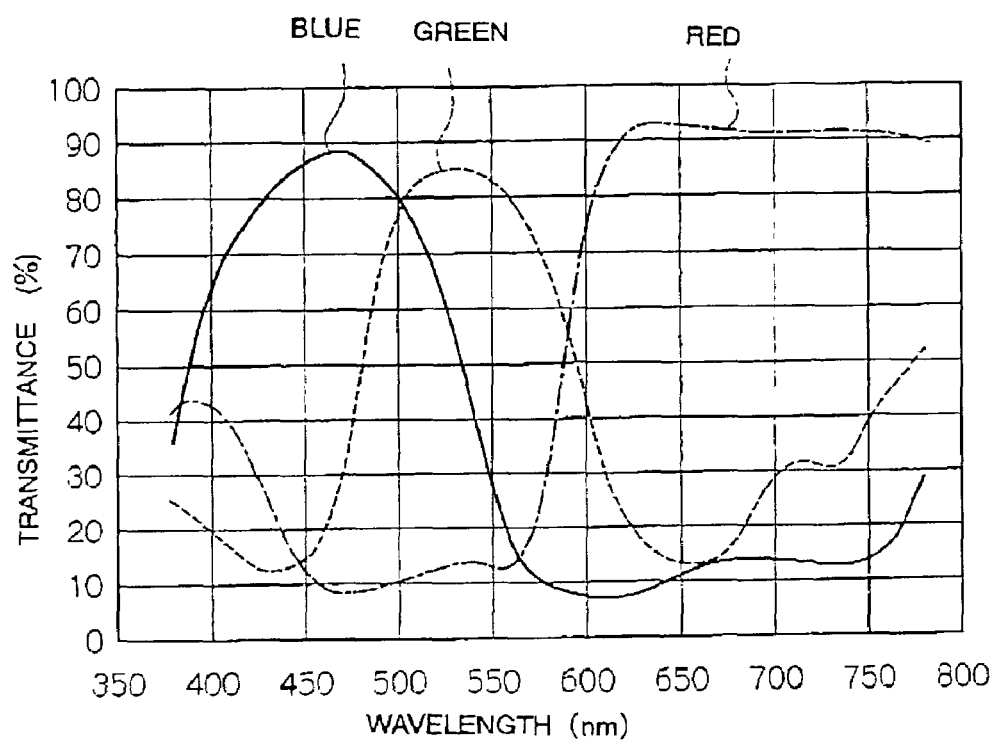
FIG. 21 is a graph showing the spectral properties of color filters used in structural example 2 of the embodiment of the present invention.
Figure 22:
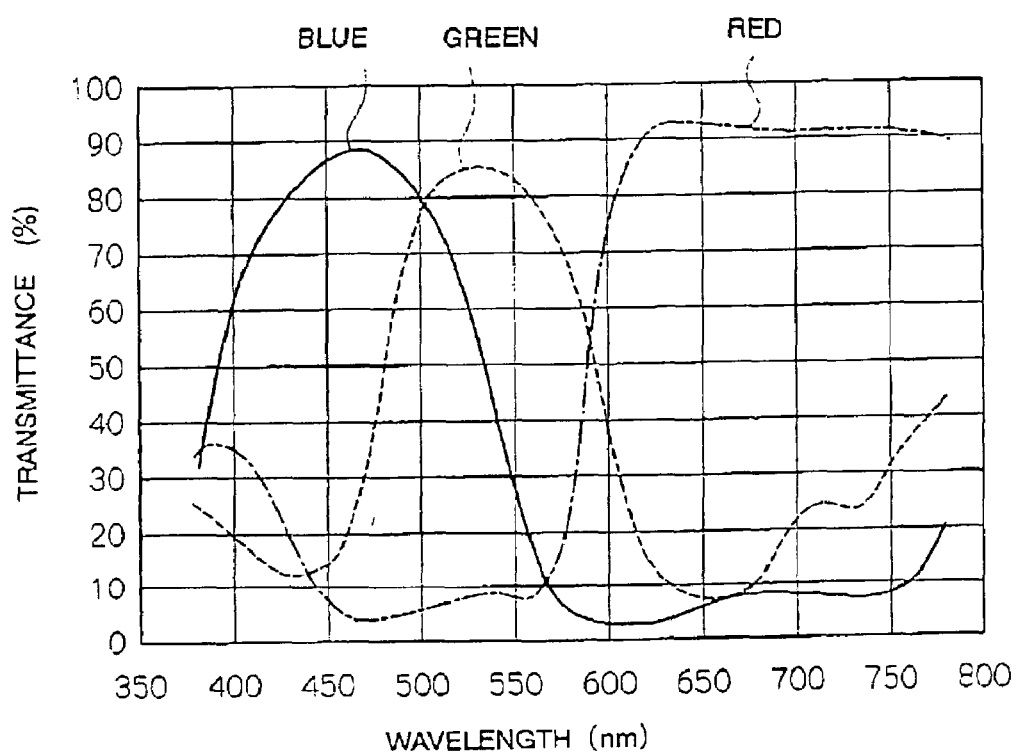
FIG. 22 is a graph showing the spectral properties of color filters used in structural example 3 of the embodiment of the present invention.

In structural example 3, instead of the color filter having the spectral properties shown in FIG. 21, a color filter having the spectral properties shown in FIG. 22 was used. When the spectral properties shown in FIGS. 21 and 22 are compared to each other, the peak portions (transmissive regions) of the curves for the individual colors are substantially equivalent to each other; however, the transmittance level in regions (absorption regions) other than the peaks in FIG. 21 is higher than that in FIG. 22. In other words, in structural example 3, a color filter having high color purity as compared to that in structural example 2 was used. In accordance with this change of the color filter, the areas of the transmissive region and the areas of the non-color region for the individual dots were slightly changed. The reflectance, the white display color and the area of color region in a reflective display mode, the transmittance, and the white display color and the area of color region in a transmissive display mode were calculated by simulation. The optical properties described above are shown in Table 1 below.

Figure 16:
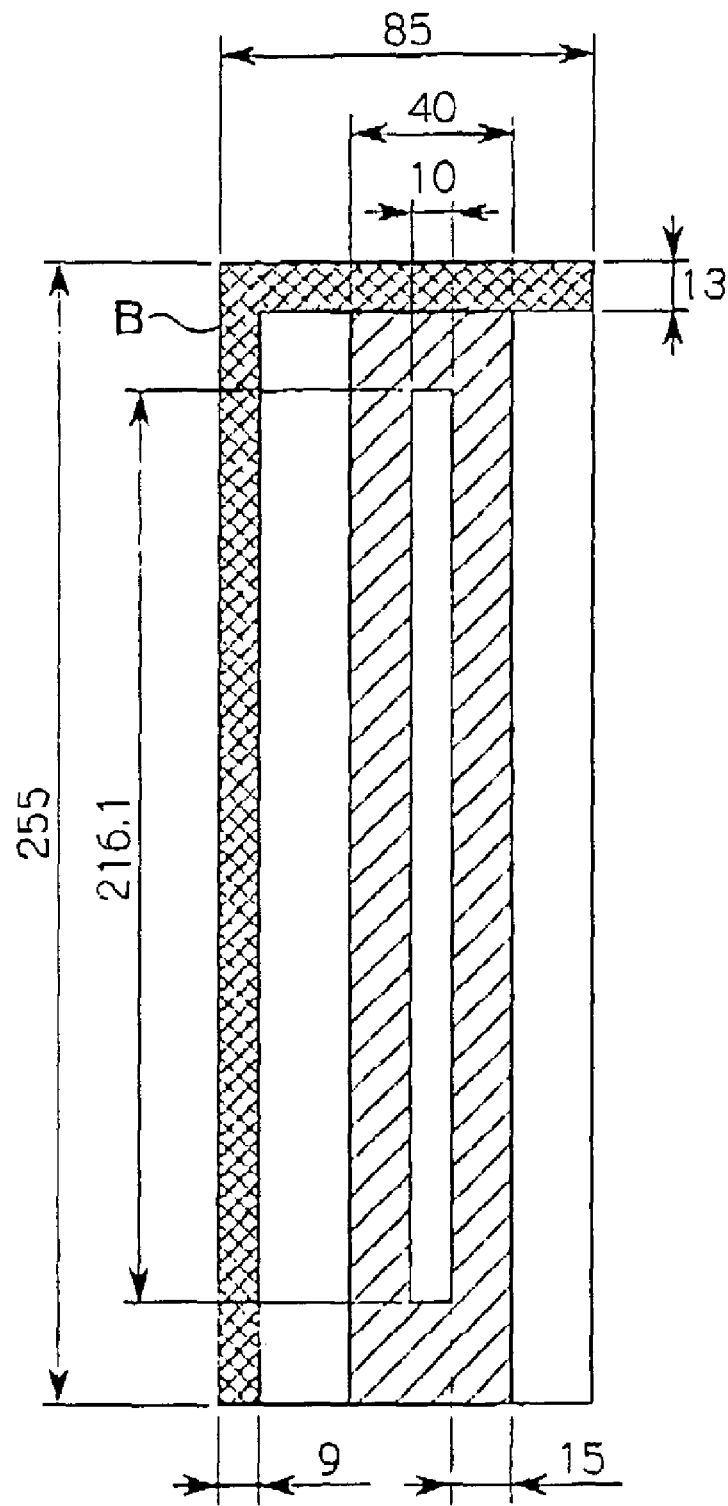
FIG. 16 is a view showing a planar pattern in which areas of individual elements of structural example 1 of an embodiment according to the present invention are realized in a conventional structure.
Figure 17:
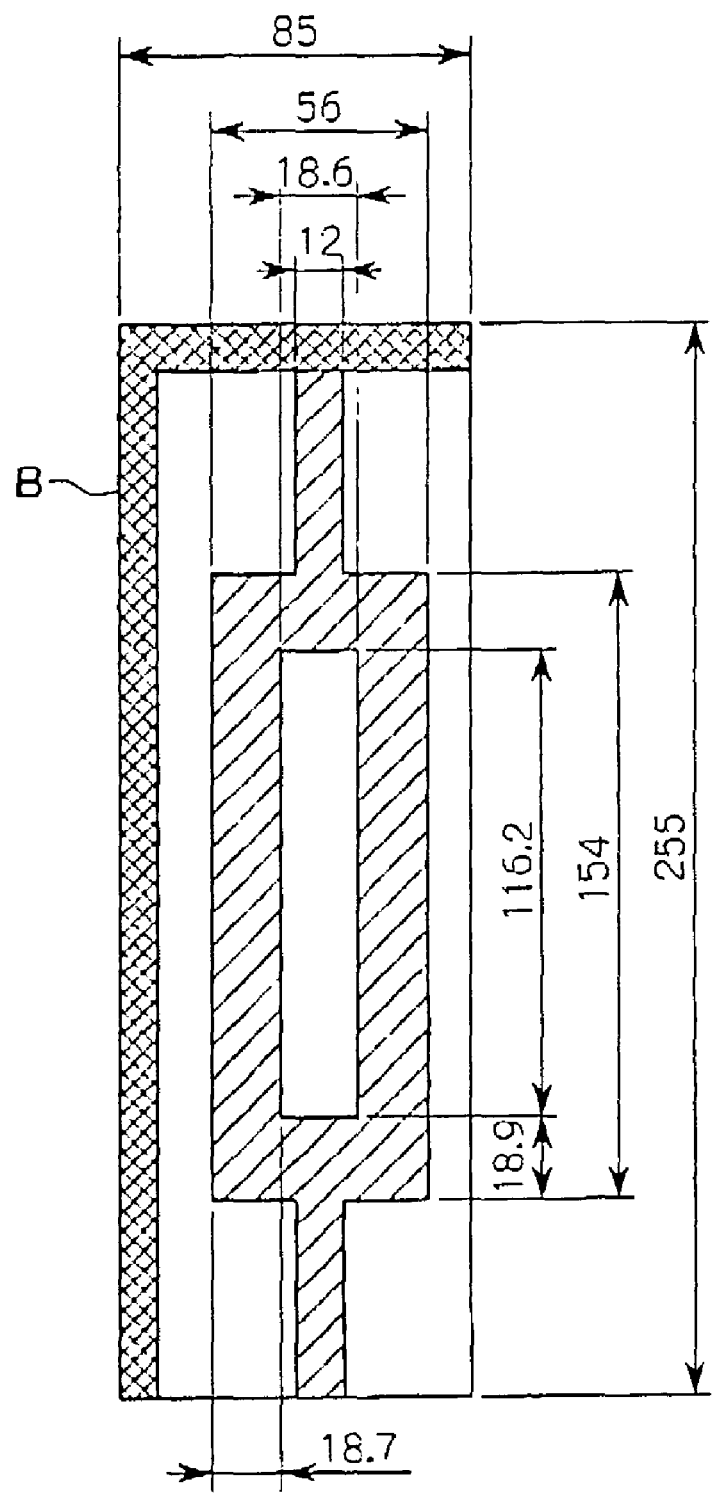
FIG. 17 is a view showing a planar pattern in which the areas of the individual elements of structural example 1 of the embodiment according to the present invention are realized in the structure of the present invention.

The optical properties of the structural examples are as shown in Table 1, and when a conventional linear and strip-shaped reflective region is used, pattern dimensions of the reflective region and the non-color region for realizing the areas of the individual portions of structural example 1 are, for example, as shown in FIG. 16. In FIGS. 16 to 20 shown below, the dimensions are represented by µm. In addition, when the areas of the individual portions of structural example 1, that is, when the areas of the individual portions as shown in FIG. 16 are realized by the structure of the present invention in which the reflective region has the width expansion portion, the dimensions are, for example, as shown in FIG. 17.

In this case, the distance between the end of the reflective region and the end of the non-color region extending in the vertical direction is 15 µm in the structure shown in FIG. 16. In a process for manufacturing a liquid crystal display device, since a current level of misalignment in a step of bonding the upper substrate to the lower substrate is approximately 15 µm, when it is assumed that the maximum misalignment between the upper and the lower substrates occurs, the alignment allowance (margin) cannot be secured at all. On the other hand, in the structure shown in FIG. 17, the distance between the end of the reflective region and the end of the non-color region is 18.7 µm. Accordingly, in this case, even when it is assumed that the maximum misalignment between the substrates occurs in a substrate-bonding step, a margin of approximately 3.7 µm can still be secured. As described above, according to the structure of the present invention, it is verified that the structure having resistance against bonding misalignment can be formed.

Next, the lateral dimension of the non-color region will be described, the dimensions thereof shown in FIGS. 16 and 17 are 10 and 18.6 µm, respectively. For example, when it is assumed that the resolution of a photolithographic technique used for manufacturing of a liquid crystal display device is approximately 10 µm, the dimension shown in FIG. 16 is the lowest value at which the opening portion can be formed, and in some cases, the opening portion may not be formed at all. On the other hand, according to the structure shown in FIG. 17, the non-color region can be reliably formed with superior accuracy.

Concerning the optical properties of structural example 1 shown in Table 1, according to "white display color in a transmissive display mode", x=0.314 and y=0.347 are satisfied; hence, it is indicated that slightly yellowish white color is displayed. Accordingly, in order to further improve the degree of whiteness of the white display color in a transmissive display mode, the areas of the individual parts were adjusted, thereby forming the structure according to structural example 2. In particular in this example, the area of the transmissive region for G in structural example 1 was significantly decreased, and in order to maintain the transmittance equivalent to that in structural example 1, the areas of the transmissive regions for R and B were both increased. In addition, on the other hand, since the area of the reflective region for G was increased, the area of the non-color region for G in structural example 1 was increased so that a G component in reflected light was decreased. In accordance with these changes, the areas of the non-color regions for R and B were adjusted so as to maintain the reflectance and the color when reflected.

Figure 18:
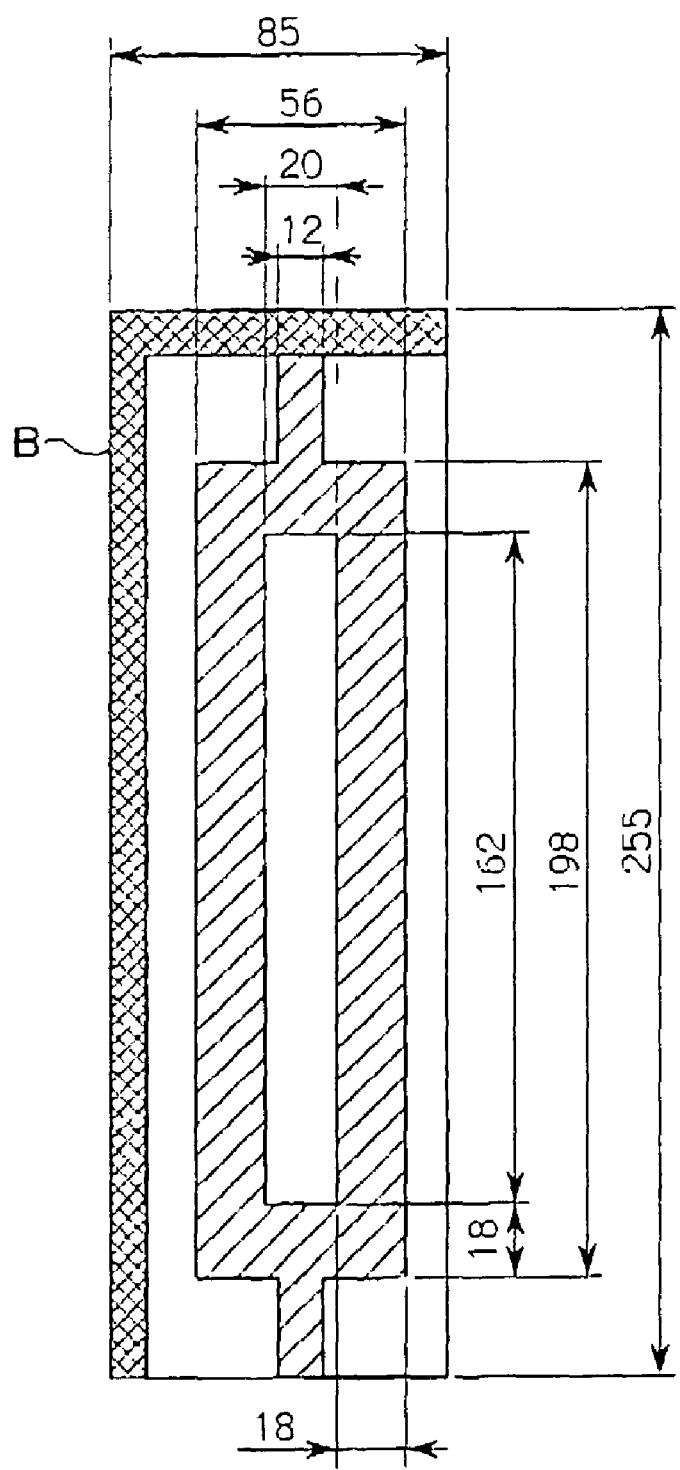
FIG. 18 is a view showing a planar pattern in which areas of individual elements of structural example 2 of an embodiment according to the present invention are realized in the structure of the present invention.

When the areas of the individual parts in structural example 2 are realized by the structure of the present invention, in which the width expansion portion is present in the reflective region, for example, the structure as shown in FIG. 18 is formed. In this structure, the distance between the end of the reflective region and the end of the non-color region was 18 µm, and hence the structure having resistance against bonding misalignment could be formed. In addition, a non-color region having a lateral dimension of 20 µm could be formed, and hence patterning of the non-color region can be performed without any problems.

Next, in structural example 3, since a color filter having high color purity as compared to that in structural example 2 was used, that is, since a color filter having dark colors was used, the transmittance equivalent to that in structural examples 1 and 2 cannot be maintained unless the area of the transmissive region is increased. Accordingly, the areas of the transmissive regions of all the dots for R, G, and B in structural example 3 were increased from those in structural example 2, thereby forming the structure according to structural example 3. On the other hand, since the areas of the reflective regions of all the dots were decreased, in order to maintain the reflectance, the areas of the non-color regions of all the dots in structural example 2 were increased. As a result, although the reflectance and the area of color region in reflection were slightly decreased, in a reflective display mode, optical properties approximately equivalent to those in structural examples 1 and 2 could be obtained. In a transmissive display mode, a transmittance of 4.5% equivalent to that in structural examples 1 and 2 could be maintained, and in addition, the area of color region in transmittion could be increased to $3.6 \times 10^{-2}$; hence, by using the color filter having high color purity, display color in a transmissive play mode could be made clearer.

Figure 19:
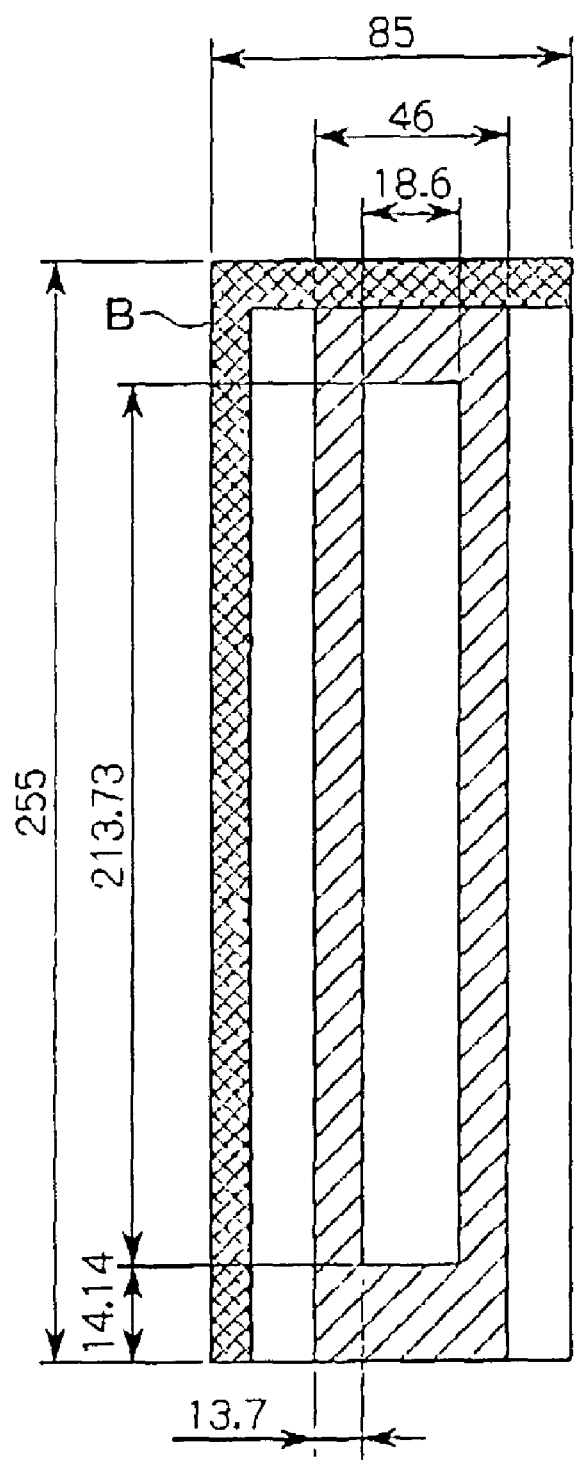
FIG. 19 is a view showing a planar pattern in which areas of individual elements of structural example 3 of the embodiment according to the present invention are realized in a conventional structure.
Figure 20:
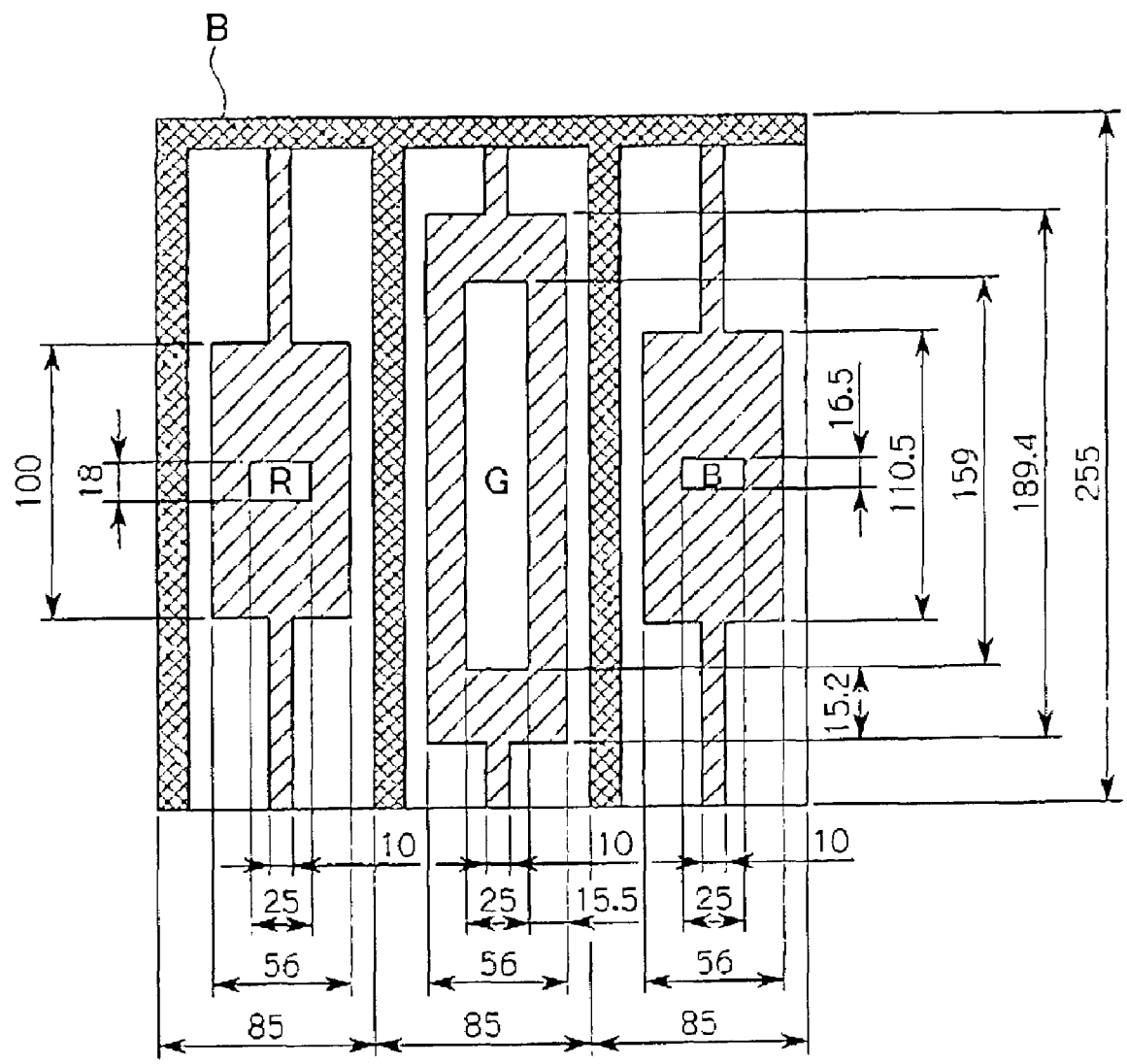
FIG. 20 is a view showing a planar pattern in which the areas of the individual elements of structural example 3 of the embodiment according to the present invention are realized in the structure of the present invention.

The pattern dimensions for the reflective region and the non-color region to realize the areas of the individual parts in structural example 3 are, for example, as shown in FIG. 19 when a conventional, linear, strip-shaped reflective region is used. In addition, when the areas of the individual parts in structural example 3, that is, the areas of the individual parts equivalent to those shown in FIG. 19, are realized by the structure of the present invention in which the reflective region has a width expansion part, for example, the structure as shown in FIG. 20 is obtained. In FIG. 20 showing structural example 3 in which most preferable optical properties can be obtained among the structural examples described above, the pattern dimensions for all the dots for R, G, and B are shown.

Concerning the distance between the end of the reflective region and the end of the non-color region extending in the vertical direction, in the structure shown in FIG. 19, the distances in the lateral direction and in the vertical direction are 13.7 and 14.14 µm, respectively. When it is assumed that the misalignment in a step of bonding the upper substrate to the lower substrate is 15 µm, no alignment allowance can be obtained, and in addition, the non-color region may protrude outside from the reflective region. As a result, desired optical properties may not be obtained at all in some cases. On the other hand, in the structure shown in FIG. 20, the distances in the dot G in the lateral and the vertical directions are 15.5 and 15.2 µm, respectively. When the areas of the individual parts in structural example 3 are realized, the margin is inevitably decreased even when the structure of the present invention is used; however, compared to the structure shown in FIG. 19, the margin is relatively large, and the structure having resistance against bonding misalignment can be formed.

As can be seen from the results of the simulation described above, according to the structures of the present invention, the structure having resistance against bonding misalignment can be formed in manufacturing a liquid crystal display device. In addition, it is verified that, by optimizing the areas of the transmissive region (reflective region) and the non-color region of each dot, a liquid crystal display device can be realized in which superior display quality can be equally performed in both a reflective display mode and in a transmissive display mode.

Fifth Embodiment

Next, an embodiment of electronic apparatuses using a liquid crystal display device (liquid crystal panel) of the present invention will be described.

Mobile Computer

Figure 24:
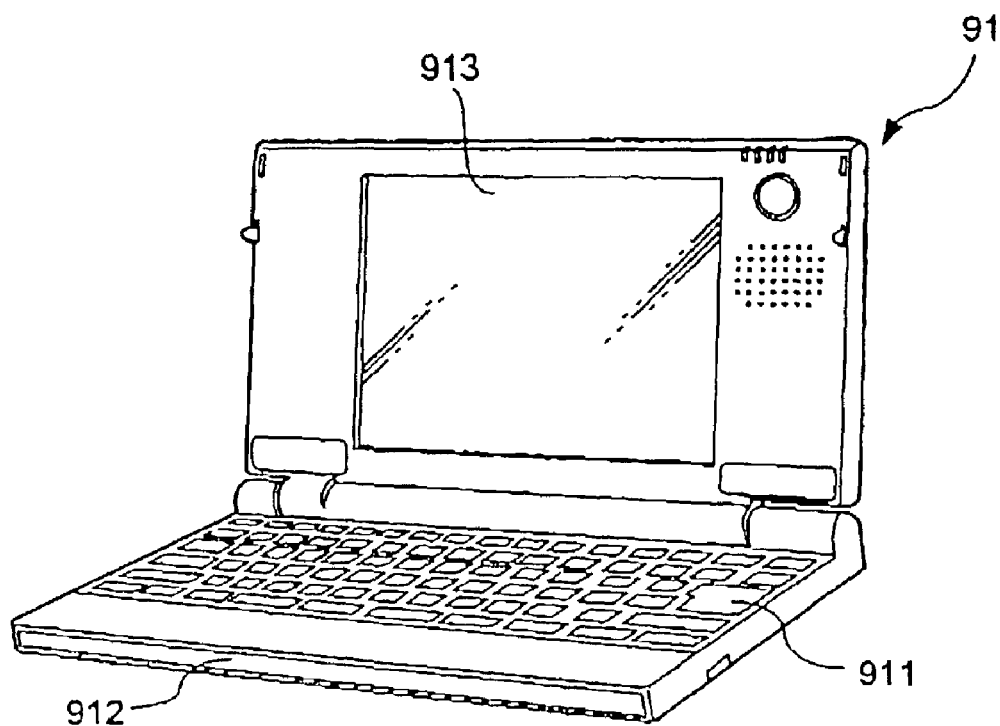
FIG. 24 is a perspective view showing the structure of a personal computer as an example of an electronic apparatus to which a liquid crystal display device of the present invention is applied.

First, an example in which the liquid crystal display device (liquid crystal panel) of the present invention is applied to a display portion of a mobile computer (so-called notebook type computer) will be described. FIG. 24 is a perspective view showing the structure of this personal computer. As shown in the figure, a personal computer 91 comprises a main body 912 provided with a keyboard 911 and a display portion 913 to which the liquid crystal display device (liquid crystal panel) according to one of the first to the fourth embodiments of the present invention is applied.

Mobile Phone

Figure 25:
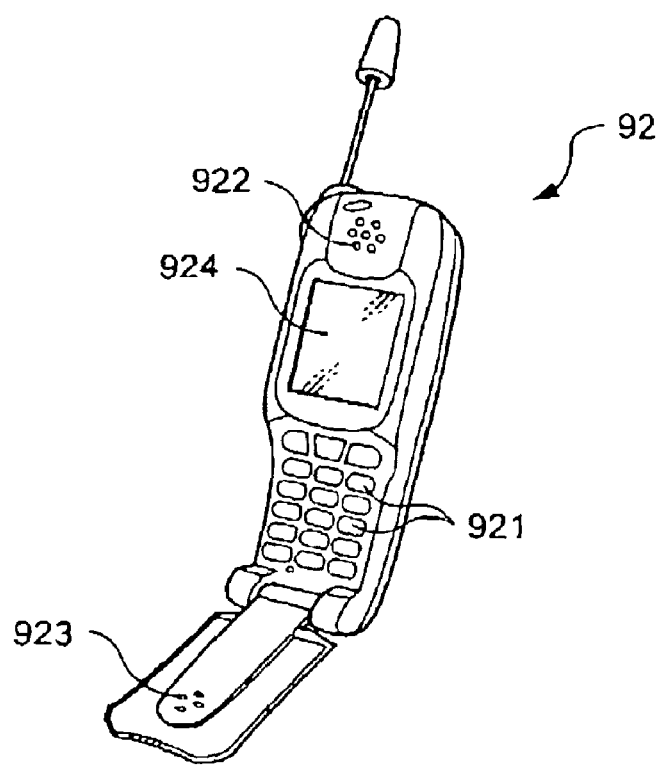
FIG. 25 is a perspective view showing the structure of a mobile phone as an example of an electronic apparatus to which a liquid crystal display device of the present invention is applied.

Next, an example in which the liquid crystal display device (liquid crystal panel) of the present invention is applied to a display portion of a mobile phone will be described. FIG. 25 is a perspective view showing the structure of this mobile phone. As shown in the figure, in addition to a plurality of operation buttons 921, a mobile phone 92 comprises an earpiece 922, a mouthpiece 923, and a display portion 924 to which the liquid crystal display device (liquid crystal panel) according to one of the first to the fourth embodiments of the present invention is applied.

As electronic apparatuses to which the liquid crystal display device (liquid crystal panel) of the present invention can be applied, in addition to the personal computer shown in FIG. 24 and the mobile phone shown in FIG. 25, for example, there may be mentioned liquid crystal televisions, view finder type or direct viewing type video tape recorders, car navigation apparatuses, pagers, electronic notebooks, electronic calculators, word processors, work stations, television phones, POS terminals, and digital still cameras. According to the liquid crystal display device (liquid crystal panel) of the present invention, the brightness both in a reflective display mode and the chroma in a transmissive display mode can be maintained, and hence superior display quality can also be maintained in both display systems. Accordingly, the liquid crystal display device of the present invention can be preferably used for electronic apparatuses in which superior display quality are required in both reflective and transmissive display modes.

As has thus been described, according to the present invention, the brightness both in a reflective display mode and the chroma in a transmissive display mode can be secured. Hence, a transflective color liquid crystal display device which exhibits fine color in both a reflective and a transmissive display mode and has superior visibility can be realized. In addition, the structure having resistance against bonding misalignment can be realized in manufacturing process of a liquid crystal display device, and simultaneously, desired optical properties such as reflectance, transmittance, and hue of display color can be stably obtained.

The disclosures of Japanese Patent Application Nos. 2001-378701 and 2002-061049 are incorporated by reference in their entirety.

TABLE 1

|  |  | UNIT | STRUCTURAL EXAMPLE 1 | STRUCTURAL EXAMPLE 2 | STRUCTURAL EXAMPLE 3 |
|---|---|---|---|---|---|
| DOT PITCH AREA | | $\mu m^2$ | 21675 | 21675 | 21675 |
| DOT AREA | | $\mu m^2$ | 18392 | 18392 | 18392 |
| AREA OF | RED | $\mu m^2$ | 8712 | 11130 | 11372 |
| TRANSMISSIVE | GREEN | $\mu m^2$ | 8712 | 6776 | 7260 |
| REGION PER DOT | BLUE | $\mu m^2$ | 8712 | 10406 | 10889 |
| AREA OF | RED | $\mu m^2$ | 360 | 180 | 450 |
| NON-COLOR | GREEN | $\mu m^2$ | 2161 | 3240 | 3975 |
| REGION PER DOT | BLUE | $\mu m^2$ | 360 | 0 | 413 |
| REFLECTANCE | | % | 20.0 | 20.3 | 19.4 |
| AREA OF COLOR REGION IN REFLECTION | | $\times 10^{-2}$ | 2.1 | 2.2 | 2.0 |
| WHITE DISPLAY COLOR IN REFLECTION | x | — | 0.328 | 0.324 | 0.327 |
| | y | — | 0.844 | 0.357 | 0.351 |
| TRANSMITTANCE | | % | 4.5 | 4.5 | 4.5 |
| AREA OF COLOR REGION IN TRANSMISSION | | $\times 10^{-2}$ | 3.1 | 3.1 | 3.6 |
| WHITE DISPLAY COLOR IN TRANSMISSION | x | — | 0.314 | 0.316 | 0.313 |
| | y | — | 0.347 | 0.327 | 0.325 |

The invention claimed is:

1. A liquid crystal display device comprising:
   dots corresponding to different color layers;
   a first substrate and a second substrate opposing to each other and holding a liquid crystal therebetween;
   reflective films provided over the first substrate and peripheral edges of the reflective films disposed in the dots; and
   the color layers are provided over the second substrate;
   wherein each of the color layers has an opening portion overlapping each of the reflective films.

2. A liquid crystal display device comprising:
   a first substrate and a second substrate opposing to each other and holding a liquid crystal therebetween;
   a plurality of dots corresponding to different color layers; and
   reflective films provided over the second substrate and peripheral edges of the reflective films disposed in the dots;
   wherein the color layers are provided over the first substrate and overlap the dots; each of the color layers has an opening portion overlapping one of the reflective films.

3. An electronic apparatus comprising a liquid crystal display device according to claim 2.

4. A liquid crystal display device comprising:
   a first substrate and a second substrate facing each other;
   a liquid crystal layer provided between the first substrate and the second substrate;
   a plurality of dots corresponding to a plurality of different color layers;
   reflective films provided over the second substrate and peripheral edges of the reflective films disposed in the dots; and
   the plurality of color layers having different colors and disposed corresponding to the dots, the color layers provided over the first substrate;
   wherein the dots have reflective regions in which the reflective films are disposed and transmissive regions in which the reflective films are not disposed; and
   wherein the color layers have non-color regions in which the color layers are not disposed, the non-color regions overlap a part of each of the reflective regions within one of the dots as viewed in plan.

5. A liquid crystal display device according to claim 4, wherein at least one of the non-color regions corresponding to at least one of the color layers has an area different from an area of each of the non-color regions corresponding to the other color layers.

6. A liquid crystal display device according to claim 4, wherein the color layers are composed of red layers, green layers and blue layers, the non-color regions corresponding to red layers, green layers, and blue layers, and each of the non-color regions corresponding to the green layers is larger than each of the non-color regions corresponding to the red layers and the blue layers.

7. A liquid crystal display device according to claim 4, wherein each of the transmissive regions corresponding to at least one of the color layers has an area different from an area of each of the transmissive regions corresponding to the other color layers.

8. A liquid crystal display device according to claim 4, wherein the color layers are composed of red layers, green layers, and blue layers, and each of the transmissive regions corresponding to the green layers is smaller than each of the transmissive regions corresponding to the red layers and the blue layers.

9. An electronic apparatus comprising the liquid crystal display device according to claim 4.

* * * * *